United States Patent
Ishida et al.

(10) Patent No.: US 8,762,011 B2
(45) Date of Patent: Jun. 24, 2014

(54) CONTROL APPARATUS FOR VEHICLE EQUIPPED WITH CONTINUOUSLY VARIABLE TRANSMISSION

(75) Inventors: Kazuki Ishida, Atsugi (JP); Hiroyasu Tanaka, Atsugi (JP); Yusuke Kimura, Nishinomiya (JP); Tetsuya Izumi, Ayase (JP); Akito Suzuki, Tokyo (JP); Takashi Eguchi, Machida (JP); Hironori Miyaishi, Kawasaki (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 165 days.

(21) Appl. No.: 13/415,026

(22) Filed: Mar. 8, 2012

(65) Prior Publication Data

US 2012/0244993 A1 Sep. 27, 2012

(30) Foreign Application Priority Data

Mar. 23, 2011 (JP) ................................. 2011-063631

(51) Int. Cl.
*F16H 61/662* (2006.01)
*F16H 61/70* (2006.01)
*F16H 37/02* (2006.01)

(52) U.S. Cl.
USPC ............................................ 701/51; 477/48

(58) Field of Classification Search
None
See application file for complete search history.

(56) References Cited

U.S. PATENT DOCUMENTS

| 6,672,981 | B2 | 1/2004 | Inoue et al. |
| 2002/0072441 | A1 | 6/2002 | Inoue et al. |
| 2004/0128046 | A1* | 7/2004 | Yamamoto et al. ............. 701/51 |
| 2006/0068953 | A1* | 3/2006 | Tsukada et al. ................... 474/8 |
| 2008/0119308 | A1* | 5/2008 | Iwasa et al. ..................... 474/70 |
| 2008/0139350 | A1* | 6/2008 | Iwasa et al. ..................... 474/18 |

FOREIGN PATENT DOCUMENTS

| EP | 2 128 499 A2 | 12/2009 |
| JP | 03-292452 A | 12/1991 |
| JP | 2002-181180 A | 6/2002 |

* cited by examiner

*Primary Examiner* — Michael J Zanelli
(74) *Attorney, Agent, or Firm* — Foley & Lardner LLP

(57) ABSTRACT

A control apparatus for a vehicle equipped with continuously-variable transmission includes a drive source; a continuously-variable transmitting mechanism including a primary pulley, a secondary pulley and a power transferring member; a friction engagement element provided between the drive source and the continuously-variable transmitting mechanism; and a vehicle-stop LOW shift control section including a vehicle-stop judging section configured to judge if the vehicle is in a stopped state. A power-transferring state of the friction engagement element is controlled by an engaging-force control. The vehicle-stop LOW shift control section starts a vehicle-stop LOW shift control to shift a pulley ratio of the continuously-variable transmitting mechanism toward LOW side when the vehicle-stop judging section determines that the vehicle is stopped under a power-transferring state where the friction engagement element is in an engaged state and the pulley ratio is not in a LOWEST region.

9 Claims, 14 Drawing Sheets

CONTROL APPARATUS FOR VEHICLE EQUIPPED WITH CONTINUOUSLY VARIABLE TRANSMISSION

BACKGROUND OF THE INVENTION

The present invention relates to a control apparatus for a vehicle equipped with continuously-variable transmission, adapted to perform a vehicle-stop LOW shift control that shifts a pulley ratio toward LOW side at the time of vehicle stop.

In the case of a vehicle equipped with belt-type continuously-variable transmission, there is a possibility that the vehicle stops under a state where the pulley ratio has not yet returned to its LOWEST state in dependence upon driver's manipulations, a road-surface state and the like, for example, when a pattern of running (moving) →deceleration→stop→restart has been repeated. After the vehicle has stopped under a pulley-ratio state other than the LOWEST state, if trying to restart the vehicle under this pulley-ratio state, a torque sufficient to start to move the vehicle is not secured. Hence, an acceleration performance for vehicle restart is inferior.

U.S. Patent Application Publication No. 2002-072441 (corresponding to Japanese Patent Application Publication No. 2002-181180) discloses a previously-proposed control apparatus for a vehicle equipped with continuously-variable transmission. In this technique, a vehicle-stop LOW shift control is performed which forcibly shifts the pulley ratio toward LOW side when the vehicle stops under a pulley-ratio state departed from a LOWEST region, in order to obtain a LOWEST-side pulley-ratio state before restarting the vehicle from the stopped state and also in order to prevent a slip between a pulley and a belt.

The above previously-proposed control apparatus defines the following conditions (a) to (c) as a start condition (criteria) for the vehicle-stop LOW shift control.

(a) The pulley ratio of belt-type continuously-variable transmitting mechanism is not in the LOWEST state.

(b) A rotational element of belt-type continuously-variable transmitting mechanism is in a stopped state.

(c) The belt-type continuously-variable transmitting mechanism is not in a power-transferring state.

That is, the vehicle-stop LOW shift control which forcibly shifts the pulley ratio of the belt-type continuously-variable transmitting mechanism toward LOW side is started when all of three conditions of the pulley-ratio condition (a), the rotational-element-stop condition (b) and the neutral condition (c) are satisfied.

SUMMARY OF THE INVENTION

However, in the above previously-proposed control apparatus, the start condition of the vehicle-stop LOW shift control includes the neutral condition (c) that is a state where the belt-type continuously-variable transmitting mechanism is not transferring any power. Hence, when the vehicle stops with a D-range (DRIVE-mode) selected, an engaged forward clutch is released to satisfy the neutral condition (c). Therefore, the vehicle-stop LOW shift control of the above previously-proposed control apparatus has the following demerits (disadvantages).

(1) In the case that the vehicle stops under the D-range, even if the conditions (a) and (b) have been satisfied, it is necessary to start a releasing control for the forward clutch and then to wait until the neutral condition (c) becomes satisfied by this releasing control, in order to start the vehicle-stop LOW shift control. Thus, a start timing of the vehicle-stop LOW shift control is late (delayed).

(2) Even if the vehicle-stop LOW shift control starts, the belt-type continuously-variable transmitting mechanism is not transferring power so that static friction force (>kinetic friction force) exists between the primary pulley and the belt. That is, the primary pulley is in contact with the belt with static friction force. Hence, a vigorous force exceeding the relatively-great static friction force is necessary in order to move the belt in a radial direction of the primary pulley (in order to vary the pulley ratio toward the LOWEST side). Therefore, a shift progression rate (advance speed) to the LOWEST region is slow.

(3) If the vehicle is requested to again start to move (restart) during the vehicle-stop LOW shift control (for example, by a depressing manipulation of accelerator pedal), it is necessary to wait until the released forward clutch is engaged in order to initiate power transfer for the vehicle restart. Thus, a recovery response of power transfer is late.

Therefore, in the case that the start condition of the vehicle-stop LOW shift control includes the neutral condition (c), when the vehicle has stopped under the D-range, there is the waiting time between the vehicle stop and the start of the vehicle-stop LOW shift control. Moreover, in this case, a shifting time between the start of vehicle-stop LOW shift control and an attainment of the pulley-ratio LOWEST state is long. Accordingly, there is a problem that a time length necessary to bring the pulley ratio to the LOWEST state is long.

Moreover, in the case that the start condition of the vehicle-stop LOW shift control includes the neutral condition (c), a start response of the vehicle-stop LOW shift control from the vehicle-stop timing is late. Also, the recovery response of power transfer is late to the request of vehicle restart. Therefore, if the request of vehicle restart is generated during the vehicle-stop LOW shift control after the vehicle stopped keeping the D-range selected, a time lag is caused between the request of vehicle restart and the obtainment of a drive force capable of restarting the vehicle. Hence, there is a problem that the restart acceleration-performance is inferior.

It is an object of the present invention to provide a control apparatus for a vehicle equipped with continuously-variable transmission, devised to shorten the time length necessary to bring the pulley ratio to the LOWEST state at the time of vehicle stop and also devised to improve the restart acceleration-performance of vehicle if the restart of vehicle is requested during the vehicle-stop LOW shift control.

According to one aspect of the present invention, there is provided a control apparatus for a vehicle equipped with a continuously-variable transmission, the control apparatus comprising: a drive source; a continuously-variable transmitting mechanism including a primary pulley, a secondary pulley, and a power transferring member wound around the primary pulley and the secondary pulley; a friction engagement element provided in a drive-force transfer system between the drive source and the continuously-variable transmitting mechanism, wherein a power-transferring state of the friction engagement element is controlled by an engaging-force control for the friction engagement element; and a vehicle-stop LOW shift control section including a vehicle-stop judging section configured to judge whether or not the vehicle is in a stopped state, wherein the vehicle-stop LOW shift control section is configured to start a vehicle-stop LOW shift control to shift a pulley ratio of the continuously-variable transmitting mechanism toward LOW side when the vehicle-stop judging section determines that the vehicle is in the stopped state under a power-transferring state where the friction engagement element is in an engaged state and also when the pulley ratio is not in a LOWEST region.

According to another aspect of the present invention, there is provided a control apparatus for a vehicle equipped with a continuously-variable transmission, the control apparatus comprising: a drive source; a continuously-variable transmitting mechanism including a primary pulley, a secondary pulley, and a power transferring member wound around the primary pulley and the secondary pulley; a friction engagement element provided in a drive-force transfer system between the drive source and the continuously-variable transmitting mechanism, wherein a power-transferring state of the friction engagement element is controlled by an engaging-force control for the friction engagement element; and vehicle-stop LOW shift control means including vehicle-stop judging means for judging whether or not the vehicle is in a stopped state, wherein the vehicle-stop LOW shift control means starts a vehicle-stop LOW shift control to shift a pulley ratio of the continuously-variable transmitting mechanism toward LOW side when the vehicle-stop judging means determines that the vehicle is in the stopped state under a power-transferring state where the friction engagement element is in an engaged state and also when the pulley ratio is not in a LOWEST region.

The other objects and features of this invention will become understood from the following description with reference to the accompanying drawings.

DETAILED DESCRIPTION OF THE INVENTION

Figure 1:
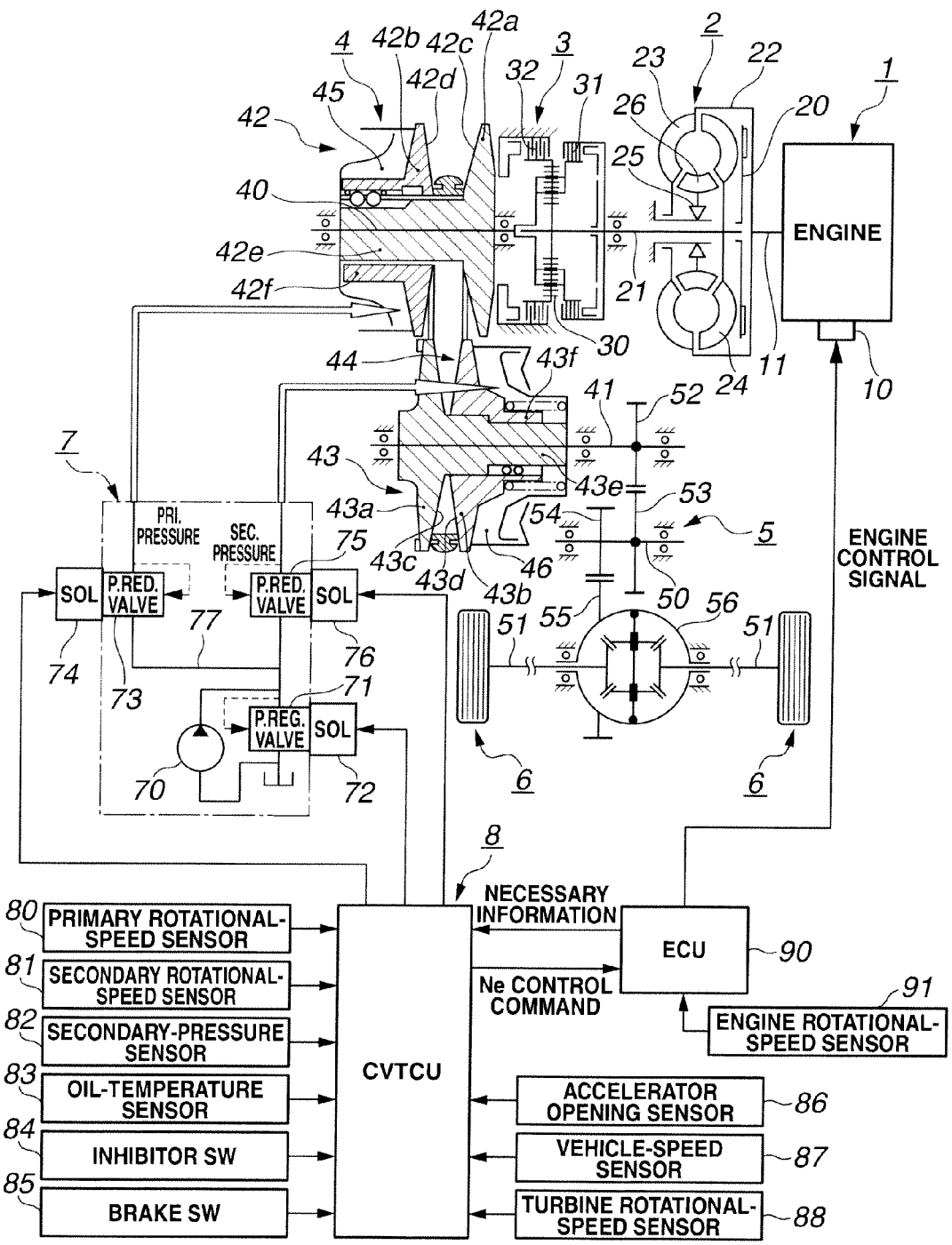
FIG. 1 is a schematic view showing drive system and control system of an engine vehicle equipped with a belt-type continuously-variable transmission in a first embodiment according to the present invention.

Hereinafter, first to fifth embodiments of control apparatus for a vehicle equipped with continuously-variable transmission according to the present invention will be explained referring to the drawings.

First Embodiment

At first, a configuration will now be explained. FIG. 1 is a schematic view showing drive system and control system of an engine vehicle equipped with a belt-type continuously-variable transmission (as one example of a vehicle having a continuously-variable transmission) in the first embodiment. Hereinafter, a schematic system configuration in the first embodiment will be explained referring to FIG. 1.

As shown in FIG. 1, the drive system of the engine vehicle equipped with the belt-type continuously-variable transmission in the first embodiment includes an engine (drive source) 1, a torque converter 2, a forward/reverse switching mechanism 3, the belt-type continuously-variable transmitting mechanism (continuously-variable transmission) 4, a final reduction gear mechanism 5, and drive wheels 6 and 6.

The engine 1 includes a rotational-speed control actuator 10. The rotational-speed control actuator 10 controls an output torque of the engine 1 in accordance with an accelerator manipulation of driver, and also can control a rotational speed and a fuel injection quantity of the engine 1 in accordance with an engine control signal derived from its external. The rotational-speed control actuator 10 performs an engine rotational-speed control (e.g., an idle-speed increasing control).

The torque converter 2 is a hydraulic power-transmitting device having a torque increasing function. The torque converter 2 includes a lockup clutch 20. The lockup clutch 20 can directly connect an output shaft 11 of the engine 1 (=torque-converter input shaft) with an output shaft 21 of the torque converter 2 when the torque increasing function is not necessary. The torque converter 2 includes a turbine runner 23 connected through a converter housing 22 with the engine output shaft 11, a pump impeller 24 connected with the torque-converter output shaft 21, and a stator 26 provided through a one-way clutch 25.

The forward/reverse switching mechanism 3 is a mechanism for switching an input rotational direction of the belt-type continuously-variable transmitting mechanism 4 between a forward-rotational direction at the time of forward running and a reverse-rotational direction at the time of reverse running. The forward/reverse switching mechanism 3 includes a double-pinion-type planetary gear set 30, a forward clutch (friction engagement element) 31 and a reverse brake 32. The double-pinion-type planetary gear set 30 includes a sun gear, a carrier and a ring gear. The sun gear of the double-pinion-type planetary gear set 30 is connected with the output shaft 21 of the torque converter 2. The carrier of the double-pinion-type planetary gear set 30 is connected with an input shaft 40 of the belt-type continuously-variable transmitting mechanism 4. When a D-range (DRIVE mode) is selected, the forward clutch 31 is engaged by a clutch pressure so that the sun gear and the carrier of the double-pinion-type planetary gear set 30 are directly connected with each other. When an R-range (REVERSE mode) is selected, the reverse brake 32 is engaged by a brake hydraulic pressure so that the ring gear of the double-pinion-type planetary gear set 30 is fixed to a case of the forward/reverse switching mechanism 3.

The belt-type continuously-variable transmitting mechanism 4 has a continuously-variable transmitting function (stepless shifting function) that continuously varies a speed ratio (=pulley ratio) between an input rotational speed of the input shaft 40 of the belt-type continuously-variable transmitting mechanism 4 and an output rotational speed of an output shaft 41 of the belt-type continuously-variable transmitting mechanism 4 by means of variation of belt contact radius. The belt-type continuously-variable transmitting mechanism 4 includes a primary pulley 42, a secondary pulley 43 and a belt (power transferring member) 44.

The primary pulley 42 includes a primary fixed sheave 42$a$ and a primary movable sheave 42$b$. The primary fixed sheave 42$a$ is formed integrally with a fixed sheave shaft 42$e$. The primary movable sheave 42$b$ is formed integrally with a movable sheave shaft 42$f$. The movable sheave shaft 42$f$ is formed in a hollow circular-tube shape and is arranged coaxially to the fixed sheave shaft 42$e$. By a primary pressure introduced into a primary-pressure chamber 45, the movable sheave shaft 42$f$ and the primary movable sheave 42$b$ slide on the fixed sheave shaft 42$e$ in an axial direction of the primary pulley 42.

The secondary pulley 43 includes a secondary fixed sheave 43$a$ and a secondary movable sheave 43$b$. The secondary fixed sheave 43$a$ is formed integrally with a fixed sheave shaft 43$e$. The secondary movable sheave 43$b$ is formed integrally with a movable sheave shaft 43$f$. The movable sheave shaft 43$f$ is formed in a hollow circular-tube shape and is arranged coaxially to the fixed sheave shaft 43$e$. By a secondary pressure introduced into a secondary-pressure chamber 46, the movable sheave shaft 43$f$ and the secondary movable sheave 43$b$ slide on the fixed sheave shaft 43$e$ in the axial direction of the secondary pulley 43.

A sheave surface 42$c$ of the primary fixed sheave 42$a$ and a sheave surface 42$d$ of the primary movable sheave 42$b$ form a V-shape groove of the primary pulley 42. On the other hand, a sheave surface 43$c$ of the secondary fixed sheave 43$a$ and a sheave surface 43$d$ of the secondary movable sheave 43$b$ form a V-shape groove of the secondary pulley 43. The belt 44 is wound around the pair of primary sheave surfaces 42$c$ and 42$d$ and the pair of secondary sheave surfaces 43$c$ and 43$d$, namely rotatably connects the primary pulley 42 with the secondary pulley 43 therebetween. The belt 44 includes laminated rings, and multiple elements. Each of the laminated rings is formed by a lamination of multiple annular rings from inside to outside thereof. The multiple elements are connected with one another since each element sandwiches two sets of the laminated rings. Thereby, the multiple elements form an annular shape.

The final reduction gear mechanism 5 reduces a transmission output speed derived from the output shaft 41 of the belt-type continuously-variable transmitting mechanism 4, and applies a differential function to the reduced output speed so as to transfer this output speed to the left and right drive wheels 6 and 6. The final reduction gear mechanism 5 includes a first gear 52, a second gear 53, a third gear 54, a fourth gear 55 and a differential gear 56 which are interposed among the transmission output shaft 41, an idler shaft 50, and left and right drive shafts 51 and 51. The first gear 52, the second gear 53, the third gear 54 and the fourth gear 55 have a speed-reduction function. The differential gear 56 has the differential function.

As shown in FIG. 1, the control system of the engine vehicle equipped with belt-type continuously-variable transmission in the first embodiment includes a shift hydraulic control unit 7 and a CVT control unit 8. The shift hydraulic control unit 7 is a hydraulic control unit of both-pressure-regulating type. The CVT control unit 8 is an electronic control unit.

The shift hydraulic control unit 7 produces the primary pressure Ppri that is introduced into the primary-pressure chamber 45, and the secondary pressure Psec that is introduced into the secondary-pressure chamber 46. The shift hydraulic control unit 7 includes an oil pump 70, a regulator valve 71, a line-pressure solenoid 72, a first pressure-reducing valve 73, a first solenoid 74, a second pressure-reducing valve 75 and a second solenoid 76.

The regulator valve 71 regulates or adjusts a line pressure PL by using a discharge pressure of the oil pump 70 as a base pressure. The regulator valve 71 includes the line-pressure solenoid 72 which adjusts a hydraulic pressure (oil pressure) pumped by the oil pump 70 to a predetermined level of the line pressure PL according to a command derived from the CVT control unit 8 and which introduces this adjusted pressure into a line-pressure oil passage 77. The oil pump 70 operates by receiving an engine drive torque from the torque-converter output shaft 21.

The first pressure-reducing valve 73 is a spool valve of normally-high type. The first pressure-reducing valve 73 adjusts the primary pressure Ppri by means of pressure-reducing control, by using the line pressure PL produced by the regulator valve 71, as its base pressure. The first pressure-reducing valve 73 includes the first solenoid 74 that operates depending on a command electric-current derived from the CVT control unit 8.

The second pressure-reducing valve 75 is a spool valve of normally-high type. The second pressure-reducing valve 75 adjusts the secondary pressure Psec by means of pressure-reducing control, by using the line pressure PL produced by the regulator valve 71, as its base pressure. The second pressure-reducing valve 75 includes the second solenoid 76 that operates depending on a command electric-current derived from the CVT control unit 8.

The CVT control unit 8 performs a pulley-ratio shift control, a line-pressure control, a forward/reverse switching control, a lockup control, a vehicle-stop LOW shift control, and the like. The CVT control unit 8 receives sensor/switch information derived from a primary rotational-speed sensor 80, a secondary rotational-speed sensor 81, a secondary-pressure sensor 82, an oil-temperature sensor 83, an inhibitor switch 84, a brake switch 85, an accelerator opening sensor 86, a vehicle-speed sensor 87, a turbine rotational-speed sensor 88 and the like. Moreover, necessary information such as an engine rotational-speed information obtained by an engine rotational-speed sensor 91 is inputted from an engine control unit 90 to the CVT control unit 8, and then, the CVT control unit 8 outputs an engine rotational-speed control command (idle-speed, increasing control command) and the like to the engine control unit 90. The vehicle-stop LOW shift control which is executed by the CVT control unit 8 will be explained later in detail. Outline explanations about the pulley-ratio shift control, the line-pressure control, the to forward/reverse switching control and the lockup control will now be given.

In the pulley-ratio shift control, the primary pressure Ppri for the primary-pressure chamber 45 and the secondary pressure Psec for the secondary-pressure chamber 46 are set to attain a target pulley ratio determined according to the input rotational speed of the transmission and an accelerator opening or the like. Then, the CVT control unit 8 outputs a command electric-current necessary for attaining the set primary pressure Ppri and secondary pressure Psec, to each of the first solenoid 74 and the second solenoid 76.

In the line-pressure control, the CVT control unit 8 sets a maximum pressure selected among needed oil pressures for respective hydraulic elements (the lockup clutch 20, the forward clutch 31, the reverse brake 32, the primary pulley 42, the secondary pulley 43) of a belt-type continuously-variable transmitting unit, as a target line pressure. Then, the CVT control unit 8 outputs a command electric-current necessary for attaining the set target line pressure, to the line-pressure solenoid 72.

In the forward/reverse switching control, the CVT control unit 8 controls engagement/release of the forward clutch 31 and the reverse brake 32 in accordance with a selected range (mode) position.

In the lockup control, the CVT control unit 8 controls engagement/release of the lockup clutch 20 in dependence upon a judgment on whether or not a vehicle-running state is in a lockup region.

Figure 2:
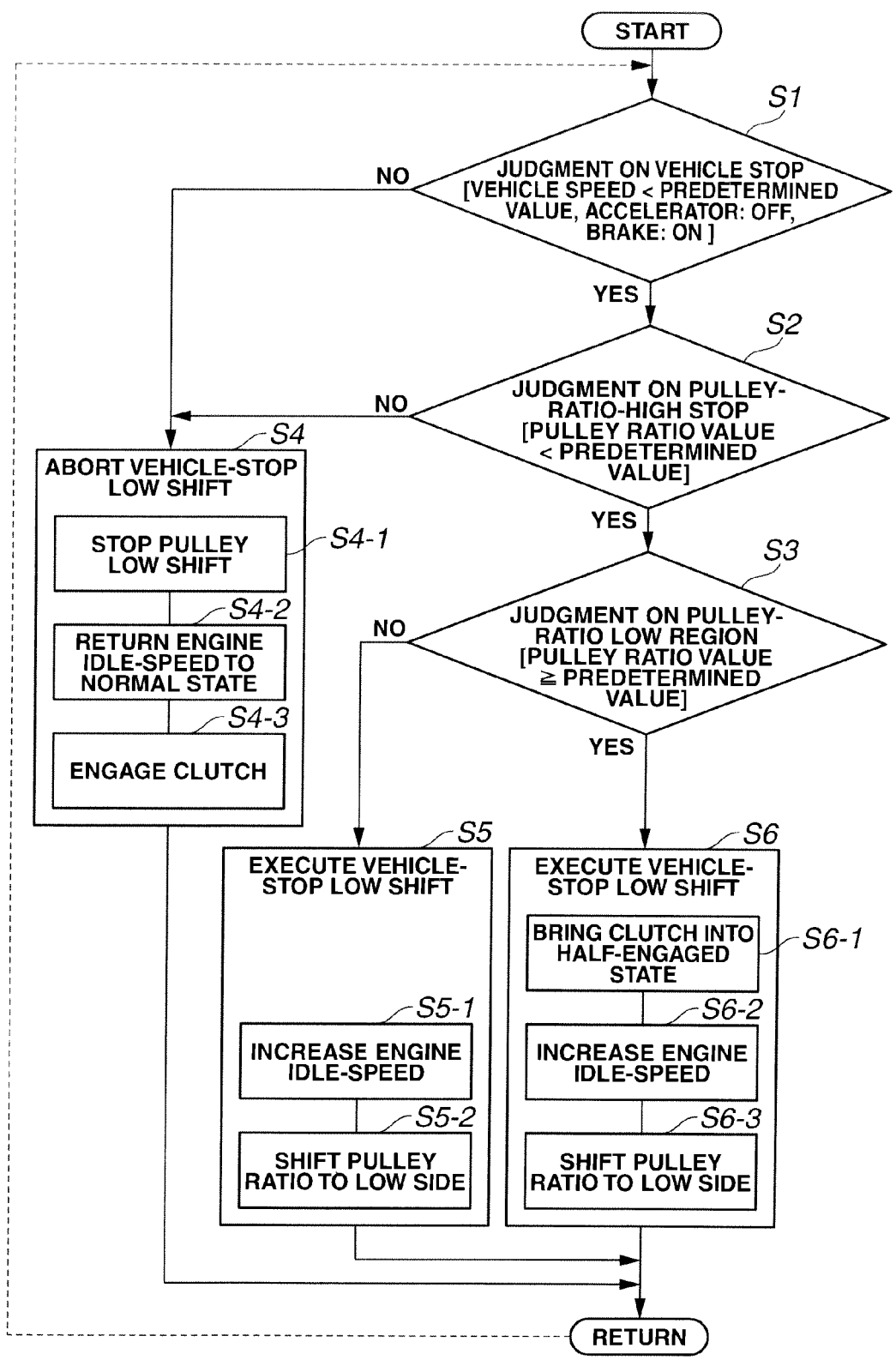
FIG. 2 is a flowchart showing flow and configuration of processing of a vehicle-stop LOW shift control which is executed by a CVT control unit in the first embodiment.

FIG. 2 is a flowchart (vehicle-stop LOW shift control means or section) showing flow and configuration of processing of the vehicle-stop LOW shift control which is executed by the CVT control unit 8 in the first embodiment. This flowchart is carried out when the D-range is being selected where the forward clutch 31 is in an engaged state to transfer power.

Hereinafter, "clutch half-engagement control" is defined as a control for restricting power transfer amount passing through the forward clutch 31 in the vehicle-stop LOW shift control. That is, under the "clutch half-engagement control", the forward clutch 31 is in engaged state to enable the power transfer, however, a clutch engaging torque for the forward clutch 31 is made smaller than that of a completely-engaged state where the forward clutch 31 has no slip against its input torque. During the "clutch half-engagement control", if the input torque to the forward clutch 31 exceeds a predetermined power transfer amount (=clutch engaging torque), a surplus of the input torque relative to the predetermined power transfer amount is absorbed by a slip of the forward clutch 31. Respective steps of FIG. 2 will now be explained.

At step S1, the control unit (the CVT control unit 8) carries out a vehicle-stop judgment on whether or not the vehicle running under the D-range has already stopped. If YES (determination of vehicle-stop) at step S1, the program proceeds to step S2. If NO (determination of vehicle-moving) at step S1, the program proceeds to step S4. The vehicle-stop judgment is done by using three conditions of a condition that a vehicle speed VSP is lower than a predetermined value (a threshold value for vehicle speed), a condition that the accelerator is in released state (OFF-state of the accelerator), and a condition that a brake pedal is in operation (ON-state of the brake). That is, the control unit determines that the vehicle has already stopped, when all the above three conditions are satisfied. It is noted that step S1 corresponds to a vehicle-stop judging section or means according to the present invention.

At step S2 subsequent to step S1, the control unit carries out a pulley-ratio HIGH stop judgment on whether or not the pulley ratio of the belt-type continuously-variable transmitting mechanism 4 at the time of determination of vehicle-stop is in a HIGH pulley-ratio region defined as all region except a LOWEST region. If YES (determination of pulley-ratio HIGH stop) at step S2, namely, if a pulley-ratio value is smaller than a predetermined value; the program proceeds to step S3. If NO (determination of pulley-ratio LOWEST region) at step S2, namely, if the pulley-ratio value is larger than or equal to the predetermined value; the program proceeds to step S4. The predetermined value of step S2 is set at a LOWEST pulley-ratio value or a value near the LOWEST pulley-ratio value at which the vehicle-stop LOW shift control is unnecessary to carry out. That is, if the pulley ratio of the belt-type continuously-variable transmitting mechanism 4 at the time of determination of vehicle-stop falls within entire pulley-ratio region except the LOWEST region (i.e., if a relation: pulley-ratio value<the predetermined value is satisfied), the control unit determines that this pulley ratio is in the HIGH pulley-ratio region.

At step S3 subsequent to step S2, the control unit carries out a pulley-ratio LOW region judgment on whether or not the pulley-ratio value of the belt-type continuously-variable transmitting mechanism 4 after the determination of pulley-ratio HIGH stop is larger than or equal to a predetermined value. If YES (pulley-ratio value≥the predetermined value) at step S3, namely, if the pulley ratio has reached a pulley-ratio LOW region (determination of pulley-ratio-LOW-region arrival); the program proceeds to step S6. If NO (pulley-ratio value<the predetermined value) at step S3, namely, if the pulley ratio has not yet reached the pulley-ratio LOW region (determination of pulley-ratio-LOW-region not-yet-arrival); the program proceeds to step S5. The predetermined value of step S3 is set at a pulley-ratio threshold value at which the input torque of the belt-type continuously-variable transmitting mechanism 4 becomes larger than a belt clamping force under a power transfer state where the forward clutch 31 is in engaged state.

At step S4 subsequent to step S1 or step S2, the control unit carries out a vehicle-stop LOW shift aborting control in a case that the vehicle-stop LOW shift control (a pulley LOW shift control, the engine idle-speed increasing control and/or the clutch half-engagement control) is currently being carried out. Then, the program is returned. This vehicle-stop LOW shift aborting control includes the following three controls.

At step S4-1, a pulley LOW shift aborting control is carried out. That is, when the pulley LOW shift control is in execution, the pulley LOW shift control is aborted or terminated so that a normal pulley-ratio shift control is resumed.

At step S4-2, an engine idle-speed normal-state returning control is carried out. That is, when the engine idle-speed increasing control is in execution, the engine idle speed is reduced by an increased amount of the engine idle-speed increasing control, so that the engine idle speed is returned to a normal rotational speed (under a normal engine idle-speed control).

At step S4-3, a clutch engaging control is carried out. That is, when the half-engagement control that reduces a clutch engaging oil-pressure for the forward clutch 31 is in execution, the clutch engaging oil-pressure for the forward clutch 31 is returned into a normal state where the forward clutch 31 causes no slip against its input torque.

At step S4, in a case that the vehicle-stop LOW shift control is not currently in execution, the control unit maintains the normal pulley-ratio shift control, the normal engine idle-speed control and the normal clutch engaging control.

At step S5 subsequent to step S3, the control unit carries out the vehicle-stop LOW shift control (the engine idle-speed increasing control and the pulley LOW shift control). Then, the program is returned. At step 5, the vehicle-stop LOW shift control is performed before the pulley ratio reaches the LOW region, and is performed by means of a cooperative control between LOW shift control and engine speed control. This vehicle-stop LOW shift control includes the following two controls.

At step S5-1, the engine idle-speed increasing control (idle-up control) is carried out. That is, a difference between the normal engine idle speed and an engine speed necessary for promoting a shift progression rate (advance speed) of the pulley LOW shift control is determined as an increment for the engine idle speed. Then, the engine idle speed is increased by this determined increment.

At step S5-2, the pulley LOW shift control is carried out. That is, the secondary pressure Psec is brought to the line pressure PL, and the primary pressure Ppri is brought to a drain pressure, so that the pulley ratio of the belt-type continuously-variable transmitting mechanism 4 is varied toward LOW side (LOW-speed side).

At step S6 subsequent to step S3, the control unit carries out the vehicle-stop LOW shift control (the clutch half-engagement control, the engine idle-speed increasing control and the pulley LOW shift control). Then, the program is returned. At step 6, the vehicle-stop LOW shift control is performed after the pulley ratio has reached the LOW region, and is performed by means of a cooperative control among LOW shift control, engine speed control and clutch control. This vehicle-stop LOW shift control includes the following three controls.

At step S6-1, the clutch half-engagement control is carried out. That is, the power transfer amount of the forward clutch 31 is reduced in a stepwise manner down to a power-transfer-amount level which causes the input torque of the belt-type continuously-variable transmitting mechanism 4 to become smaller than or equal to the belt clamping force under the LOWEST(-speed) pulley ratio.

At step S6-2, the engine idle-speed increasing control is carried out. This step S6-2 is similar as step S5-1.

At step S6-3, the pulley LOW shift control is carried out. This step S6-3 is similar as step S5-2.

Moreover, at step S6, a circumferential-slip predicting section (circumferential-slip predicting means) included in the CVT control unit 8 predicts whether or not a circumferential slip between the primary pulley 42 and the belt 44 will occur during the vehicle-stop LOW shift control in which the pulley ratio is shifted toward LOW(-speed) side. If the circumferential-slip predicting section predicts that the circumferential slip occurs, the program proceeds to step S4. Then, at step S4, the pulley-ratio shift toward LOW side is aborted. This circumferential-slip predicting section predicts whether or not the circumferential slip will occur, based on a variation amount of rotational speed of the primary pulley 42.

Next, operations will now be explained. Operations in the control apparatus for a vehicle equipped with continuously-variable transmission according to the first embodiment will be explained based on division items of "Comparison of operations of vehicle-stop LOW shift control", "Comparison of motion mechanism of vehicle-stop LOW shift", "Start condition of vehicle-stop LOW shift control", "Operations of vehicle-stop LOW shift control which is started in HIGH region" and "Operations of vehicle-stop LOW shift control which is started in LOW region".

Hereinafter, regarding "belt slip", a term "minute slip" and a term "circumferential slip" will be used in distinction from each other. Although both of the "minute slip" and "circumferential slip" mean that the belt 44 slips in a circumferential direction of pulley relative to pulley rotation, a slip amount of the "minute slip" is much smaller than a slip amount of the "circumferential slip" ("minute slip"<<<"circumferential slip"). That is, the term "minute slip" will be used as a slip amount that does not damage the belt or the pulley. Contrary to this, the term "circumferential slip" will be used as a slip amount that damages the belt or the pulley.

[Comparison of Operations of Vehicle-Stop LOW Shift Control]

A comparative example is now cited which acts as follows at the time of vehicle stop. When the pulley-ratio condition (a) and the vehicle-stop condition (b) as mentioned in "Background of the invention" are satisfied with the D-range selected, an engaged forward clutch is released to satisfy the neutral condition (c). Thereby, when all the three conditions (a), (b) and (c) are satisfied, a vehicle-stop LOW shift control is started which forcibly shifts the pulley ratio of belt-type continuously-variable transmitting mechanism toward LOW side.

Figure 3:
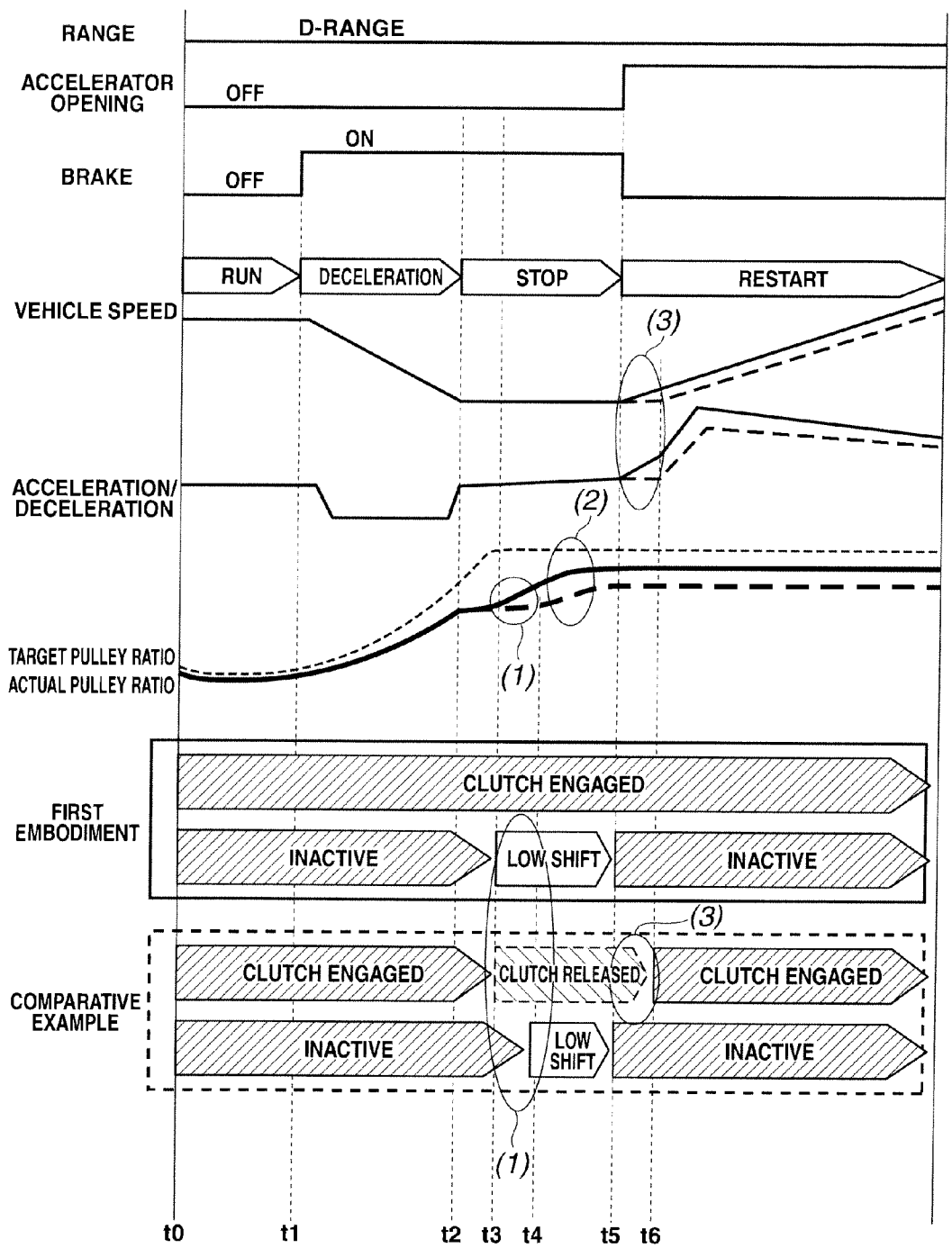
FIG. 3 is a time chart which explains a comparison between operations of a vehicle-stop LOW shift control of comparative example and operations of the vehicle-stop LOW shift control according to the present invention, and which shows respective characteristics of a range position, an accelerator opening, a brake, a vehicle speed, an acceleration/deceleration, a target pulley ratio and an actual pulley ratio.

Now, a comparison between operations of the vehicle-stop LOW shift control of the comparative example and operations of the vehicle-stop LOW shift control according to the present invention will be explained based on a time chart of FIG. 3 showing a pattern of running (moving) →deceleration→stop→restart. In FIG. 3, a time t0 denotes a timing when the accelerator is turned off (ON→OFF) during the vehicle running. A time t1 denotes a timing when the deceleration is started by turning on (OFF→ON) the brake(-pedal). A time t2 denotes a timing when the vehicle has actually just stopped. A time t3 denotes a timing of determination of vehicle-stop. A time t5 denotes a timing when the vehicle is restarted by turning off the brake (ON→OFF) and concurrently by turning on the accelerator (OFF→ON) during the vehicle-stop LOW shift control while keeping the D-range selected.

In the case of comparative example, a start condition (initiation condition) of the vehicle-stop LOW shift control includes the neutral condition (c) that is a state where the belt-type continuously-variable transmitting mechanism is not transferring any power. Hence, there are the following demerits (disadvantages).

(1) When the conditions (a) and (b) have been just satisfied at timing t3, it is necessary to start a releasing control for the forward clutch 31 and then to wait until the neutral condition (c) becomes satisfied by the releasing control, in order to start the vehicle-stop LOW shift control. Thereby, the vehicle-stop LOW shift control starts at timing t4. Thus, a start timing of the vehicle-stop LOW shift control is late (delayed).

(2) When the vehicle-stop LOW shift control starts at timing t4, the belt-type continuously-variable transmitting mechanism 4 is not transferring power so that static friction force (>kinetic friction force) exists between the primary pulley 42 and the belt 44. That is, the primary pulley 42 is in contact with the belt 44 with static friction force. Hence, a vigorous force exceeding the relatively-great static friction force is necessary in order to move the belt 44 in a radial direction of the primary pulley 42 (in order to vary the pulley ratio toward the LOWEST side). Therefore, a varying gradient (rate) of actual pulley ratio is small, so that the shift progression rate (advance speed) to the LOWEST region is slow.

(3) If the vehicle is requested to again start to move (restart) at timing t5 during the vehicle-stop LOW shift control, it is necessary to wait until the released forward clutch 31 is engaged in order to initiate the power transfer for the vehicle restart. Hence, as shown in FIG. 3, vehicle speed and acceleration rise from timing t6. Thus, a recovery response of the power transfer is late (delayed).

Therefore, in the case that the start condition (i.e., start criteria) of the vehicle-stop LOW shift control includes the neutral condition (c) as the comparative example, when the vehicle stops maintaining the selected D-range, there is the waiting time between the vehicle stop and the start of vehicle-stop LOW shift control. Moreover, in this case, a shifting time between the start of vehicle-stop LOW shift control and an attainment of the pulley-ratio LOWEST state is long. Accordingly, as shown in FIG. 3, the pulley ratio of the comparative example has not reached the LOWEST state at timing t5 at which the restart of vehicle is desired. As is clear from this, a time length necessary to bring the pulley ratio to the LOWEST state is relatively long.

Moreover, in the case that the start condition of the vehicle-stop LOW shift control includes the neutral condition (c) as the comparative example, an initiation response of the vehicle-stop LOW shift control from the vehicle-stop timing is late (timing t4). Also, the recovery response of power transfer to the request of vehicle restart is late (timing t6). Therefore, if the request of vehicle restart is generated during the vehicle-stop LOW shift control after the vehicle stopped keeping the D-range selected, a time lag (t5-t6) is caused between the request of vehicle restart and the obtainment of a drive force capable of restarting the vehicle. Hence, a restart acceleration-performance is inferior.

Contrary to this, in the vehicle-stop LOW shift control according to the first embodiment, when it is determined that the vehicle is in stopped state and that the pulley ratio of belt-type continuously-variable transmitting mechanism 4 is not in the LOWEST region under the power-transferring state where the forward clutch 31 is in engaged state; the vehicle-stop LOW shift control for shifting the pulley ratio obtained at the time of determination of vehicle stopped-state toward LOW side is started (initiated). That is, in the first embodiment according to the present invention, the start condition of the vehicle-stop LOW shift control includes a power-transfer condition (criterion). This power-transfer condition is satisfied when the forward clutch 31 is in engaged state so that the belt-type continuously-variable transmitting mechanism 4 is in power-transferring state. Therefore, there are the following merits.

(1) In the case that the vehicle stops with D-range, the vehicle-stop condition and the pulley-ratio condition are satisfied at timing t3. At this timing t3, the vehicle-stop LOW shift control is initiated because of the power-transferring state. Therefore, the initiation response (t2-t3) of the vehicle-stop LOW shift control from the actual stop timing of vehicle is quicker than that (t2-t4) of the comparative example.

(2) Under the vehicle-stop LOW shift control, kinetic friction force (<static friction force) exists between the primary pulley 42 and the belt 44. That is, the primary pulley 42 which is being slightly rotated by the power transfer from the drive source (engine) is in contact with the belt 44 which is in stopped state, with kinetic friction force. Hence, the belt 44 is moved in the radial direction of the primary pulley 42 by a force just exceeding the relatively-small kinetic friction force. Accordingly, the varying gradient of actual pulley ratio is large, so that the shift progression speed to the LOWEST region is fast.

(3) When the restart of vehicle is requested during the vehicle-stop LOW shift control, it is not necessary to wait until the already-completely-released forward clutch 31 is engaged as in the comparative example. In the first embodiment according to the present invention, the power-transferring state is maintained because the forward clutch 31 remains in engaged state. Hence, as shown in FIG. 3, the vehicle speed and acceleration in the first embodiment rise from timing t5. Thus, the start response of power transfer is quick.

Therefore, in the case that the start condition of the vehicle-stop LOW shift control includes the power-transfer condition as the first embodiment, when the vehicle stops maintaining the selected D-range, the waiting time between the vehicle stop and the start of vehicle-stop LOW shift control is shortened. Moreover, in this case, the shifting time between the start of vehicle-stop LOW shift control and the attainment of the pulley-ratio LOWEST state is shortened. Thus, the time length necessary to bring the pulley ratio to the LOWEST state can be shortened at the time of vehicle stop.

Moreover, in the case that the initiation condition of the vehicle-stop LOW shift control includes the power-transfer condition as the first embodiment; when the vehicle stops under the power-transferring state, the vehicle-stop LOW shift control is initiated in quick response to the vehicle stop, and also, the initiation response of power transfer to the request of vehicle restart is quick. Therefore, if the request of vehicle restart is generated during the vehicle-stop LOW shift control after the vehicle stopped keeping the D-range selected, the time lag is shortened between the request of vehicle restart and the obtainment of a drive force capable of restarting the vehicle. Hence, a favorable acceleration-performance of the restart is ensured in the first embodiment.

[Comparison of Motion Mechanism of Vehicle-Stop LOW Shift]

Whereas the shift progression speed to the LOWEST region is slow in the case of comparative example, the shift progression speed to the LOWEST region is fast in the first embodiment according to the present invention, as mentioned above. That is, the shift progression speed to the LOWEST region is different between in the comparative example and in the first embodiment. A motion mechanism of the vehicle-stop LOW shift will now be compared between in the comparative example and in the first embodiment, while giving a reason for making the difference of shift progression speed.

At first, in the case of comparative example, since the vehicle-stop LOW shift is started under the completely-released state of the forward clutch 31, the input torque to the primary pulley 42 is equal to 0. Hence, all of the primary pulley 42, the secondary pulley 43 and the belt 44 are in stopped state (i.e., do not rotate at all). Static friction force is produced between the primary pulley 42 and the belt 44. Under this situation, the vehicle-stop LOW shift control is performed by increasing the secondary pressure Psec for the secondary pulley 43 and reducing the primary pressure Ppri for the primary pulley 42 so as to cause a belt sandwiching force of the secondary pulley 43 to be greater than a belt sandwiching force of the primary pulley 42.

However, in the vehicle-stop LOW shift of the comparative example, there is static friction force (>kinetic friction force) between the primary pulley 42 and the belt 44 as mentioned above. Hence, a vigorous force exceeding the relatively-great static friction force is necessary in order to move the belt 44 relative to the primary pulley 42 in a radially-inner direction of the primary pulley 42 by means of vertical slide (i.e., in order to vary the pulley ratio toward the LOWEST side). When the belt 44 moves in a radially-outer direction of the secondary pulley 43 by means of vertical slide in the secondary pulley 43, a force exceeding the static friction force is applied from the belt 44 to the sheave surfaces 42c and 42d of the primary pulley 42, so that the belt 44 moves by means of vertical slide in the radially-inner direction of the primary pulley 42 by a specified amount. However, when a tension of the belt 44 against the sheave surfaces 42c and 42d is reduced by this radially-inner-directional vertical-slide movement of the belt 44, the radially-inner-directional vertical-slide movement of the belt 44 stops. That is, in the primary pulley 42, the belt 44 moves in the radially-inner direction and then stops, repeatedly. Namely, the comparative example has a shift motion mechanism in which the belt 44 moves bit by bit in the radially-inner direction of the primary pulley 42 by means of vertical slide, in a stick-slip manner.

Therefore, the speed of shift progression toward the LOWEST region is slow. In addition, when the force exceeding static friction force comes to be not applied from the belt 44 to the sheave surfaces 42c and 42d of the primary pulley 42, the LOW shift is stopped.

Figure 4:
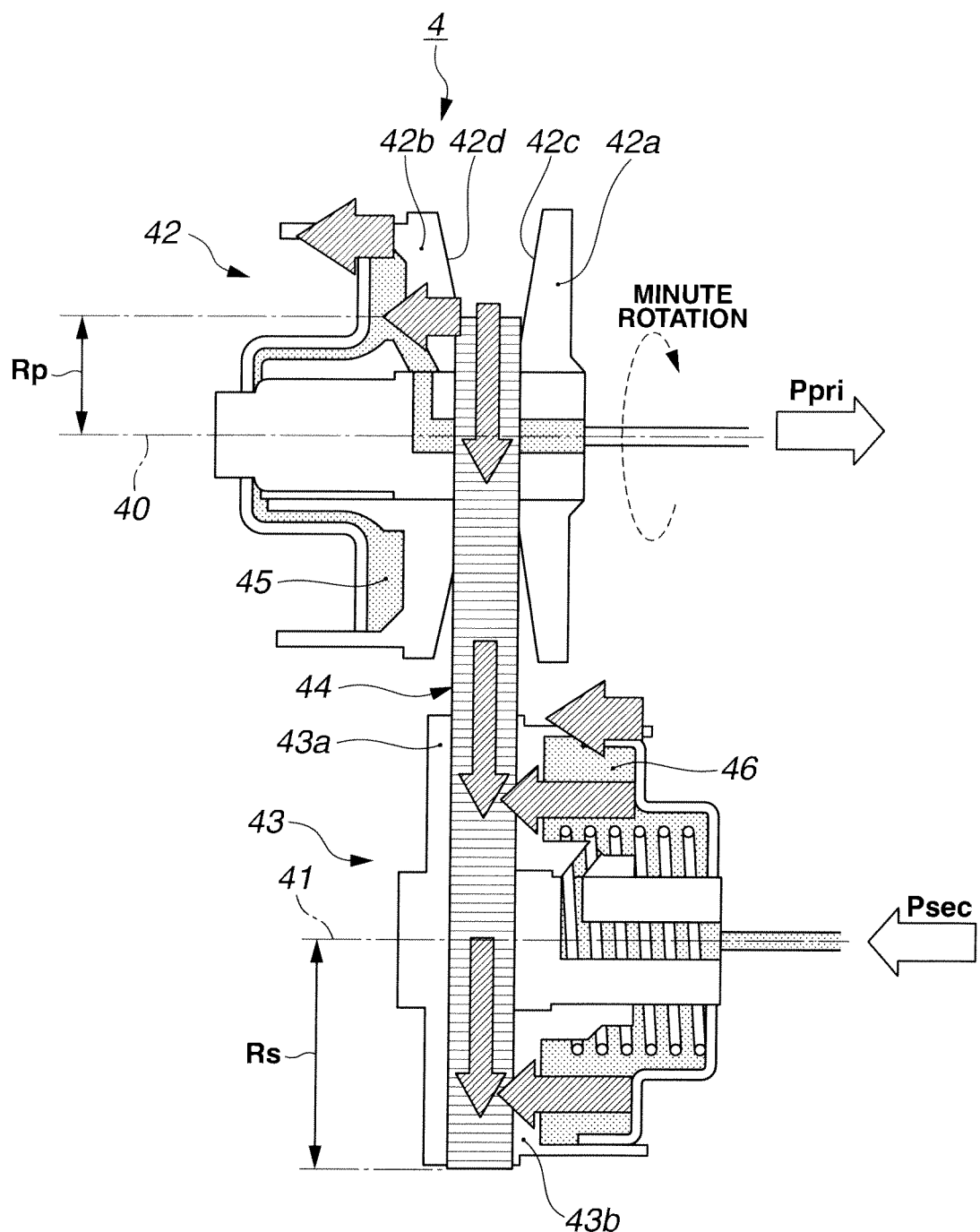
FIG. 4 is an explanatory view showing a mechanism of vehicle-stop LOW-shift motion in a belt-type continuously-variable transmitting mechanism according to the first embodiment.

Contrary to this, in the first embodiment according to the present invention, the vehicle-stop LOW shift control is started with the forward clutch 31 engaged. Thereby, the torque derived from the engine 1 is inputted through the torque converter 2 and the forward clutch 31 to the primary pulley 42. By this input torque, the primary pulley 42 slightly rotates. (At this time, the secondary pulley 43 and the belt 44 are not rotating, i.e., in a stopped state) Therefore, minute slip is generated between the primary pulley 42 and the belt 44 so that kinetic friction force exists between the belt 44 and the primary pulley 42. Under this situation, as shown in FIG. 4, the vehicle-stop LOW shift is performed by increasing the secondary pressure Psec for the secondary pulley 43 by use of the line pressure PL and by reducing the primary pressure Ppri for the primary pulley 42 by use of the drain pressure so as to cause the belt sandwiching force of the secondary pulley 43 to be greater than the belt sandwiching force of the primary pulley 42.

Therefore, in the vehicle-stop LOW shift according to the first embodiment, the kinetic friction force (<static friction force) exists between the primary pulley 42 and the belt 44 as mentioned above. Hence, in order to move the belt 44 relative to the primary pulley 42 in the radially-inner direction of the primary pulley 42 (i.e., in order to vary the pulley ratio toward the LOWEST side), it is only necessary to apply a force just larger than the relatively-small kinetic friction force, to the belt 44. By such a level of force, the belt 44 moves in the radially-inner direction of the primary pulley 42 while causing the minute slip in the circumferential direction of the primary pulley 42. That is, as shown in FIG. 4, by enlarging the secondary pressure Psec (=line pressure PL), the secondary movable sheave 43b of the secondary pulley 43 is moved, so that the belt 44 moves in the radially-outer direction of the secondary pulley 43 by means of vertical slide. By this radially-outer-direction movement of the belt 44, a force exceeding the kinetic friction force is applied from the belt 44 to the sheave surfaces 42c and 42d of the primary pulley 42. Then, the belt 44 generating the minute slip in the circumferential direction moves smoothly in the radially-inner direction of the primary pulley 42 because of the force exceeding the kinetic friction force. That is, in short, the first embodiment has a shift motion mechanism as follows. The belt 44 slides vertically in the radially-outer direction of the secondary pulley 43 to enlarge a belt-winding radius Rs of the secondary pulley 43. In response to this vertical slide in the secondary pulley 43, the belt 44 remaining in a minute-slip state in the side of primary pulley 42 slides vertically in the radially-inner direction of the primary pulley 42 smoothly to reduce a belt-winding radius Rp of the primary pulley 42.

Thus, the shift progression rate toward the LOWEST region is fast. In addition, the shift motion toward the LOW side is continuously done by virtue of relatively-low kinetic friction force between the belt 44 and the primary pulley 42. Therefore, the vehicle-stop LOW shift enabling the pulley ratio to reach the LOWEST region is ensured in the first embodiment according to the present invention.

[Start Condition of Vehicle-Stop LOW Shift Control]

The first embodiment defines the following conditions (a') to (c') as the start condition (criteria) of the vehicle-stop LOW shift control.

(a') The belt-type continuously-variable transmitting mechanism 4 is in the power-transferring state.

(b') It is determined that the vehicle has already stopped.

(c') The pulley ratio of the belt-type continuously-variable transmitting mechanism 4 is not in the LOWEST region.

That is, the start condition for the vehicle-stop LOW shift control is a satisfaction of all of three conditions of the power-transfer-state condition (a'), the vehicle-stop condition (b') and the pulley-ratio condition (c').

Among these three conditions, the power-transfer-state condition (a') is unique to the vehicle-stop LOW shift control of the first embodiment according to the present invention, and the pulley-ratio condition (c') is common to the comparative example or earlier technology. Reason why the start condition of the vehicle-stop LOW shift control in the first embodiment includes the vehicle-stop condition (b') will now be explained.

When the vehicle is decelerated, the lockup clutch 20 and the forward clutch 31 are in the engaged state in order to obtain an engine brake. If a rapid torque change is inputted from the engine 1 functioning as the drive source or from the drive wheels 6 and 6 under such a decelerating state of vehicle, the belt 44 might cause the circumferential slip because there is no part functioning as a fuse for absorbing the rapid torque change. Therefore, during the deceleration of vehicle during which there is a possibility that the circumferential slip of the belt 44 is caused, the shift toward the LOWEST region by the vehicle-stop LOW shift control needs to be avoided.

Therefore, at step S1 of FIG. 2, it is determined that the vehicle has stopped, at the case of satisfaction of three conditions of the condition that the vehicle speed VSP is lower than the predetermined value (<threshold value for vehicle speed), the condition that the accelerator is in the released state (OFF-state of the accelerator foot-pedal), and the condition that the driver is operating the brake (ON-state of the brake pedal). That is, in the first embodiment, if at least any one of the three conditions is not satisfied, the vehicle-stop LOW shift control is not carried out.

Information of the vehicle speed VSP is obtained from the vehicle-speed sensor 87 provided at the output shaft of the belt-type continuously-variable transmitting mechanism 4. The vehicle-speed sensor 87 catches a rotational-speed behavior of the output shaft as a pulse signal, and then regards a count value of pulses read within a predetermined time length as the vehicle-speed information. Hence, for example, in a vehicle-speed region higher than about 5 km/h, there are a plurality of counted pulses, so that the vehicle-speed information can be accurately obtained. However, in an extremely-low-speed region or a vehicle-stop region, the number of pulses read within the predetermined time length ranges from 0 to a few, so that a detection accuracy of vehicle speed is inferior. Accordingly, when trying to detect the stopped state of vehicle (VSP=0), for example, a time interval is measured between one pulse derived from the vehicle-speed sensor 87 and next another pulse derived from the vehicle-speed sensor 87. If this time interval between the two adjacent pulses is larger than a predetermined vehicle-stop-determination time, it is detected (determined) that the vehicle is in the stopped state (VSP=0). By virtue of such a detecting method, the vehicle-stop determination based on vehicle-speed-sensor information can be accurately performed by use of the generally-available (pulse-type) vehicle-speed sensor 87.

[Operations of Vehicle-Stop LOW Shift Control Which is Started in HIGH Region]

In the case that the vehicle-stop LOW shift control is started when the pulley ratio is in the HIGH region, it is necessary to maintain the minute slip of the belt 44 until the pulley ratio reaches the LOWEST region while continuing the LOW shift control. Operations of the vehicle-stop LOW shift control which is started in the HIGH region will now be explained.

In the case that the start condition of the vehicle-stop LOW shift control is satisfied when the pulley ratio is in the HIGH region, a flow proceeding as step S1→step S2→step S3→step S5→RETURN in the flowchart of FIG. 2 is repeated. That is, at step S5, the engine idle-speed increasing control and the pulley LOW shift control are executed as the vehicle-stop LOW shift control.

Then, when it is determined that the pulley ratio is in the LOW region at step S3 because of the progress of the vehicle-stop LOW shift control, a flow proceeding as step S1→step S2→step S3→step S6→RETURN in the flowchart of FIG. 2 is repeated. That is, at step S6, the clutch half-engagement control, the engine idle-speed increasing control and the pulley LOW shift control are executed as the vehicle-stop LOW shift control.

Then, when the pulley ratio reaches the LOWEST region because of the progress of the vehicle-stop LOW shift control, a flow proceeding as step S1→step S2→step S4→RETURN in the flowchart of FIG. 2 is repeated. That is, at step S4, the pulley LOW shift aborting control, the engine idle-speed normal-state returning control and the clutch engaging control are executed as the vehicle-stop LOW shift aborting control.

Moreover, if the driver releases the brake(-pedal) according to his vehicle-restart intention after the vehicle-stop LOW shift control, the program proceeds as step S1→step S4 in the flowchart of FIG. 2. When the vehicle-stop LOW shift aborting control of step S4 has been completed, the normal pulley-ratio shift control is executed to cause the actual pulley ratio to follow the target pulley ratio.

Figure 5:
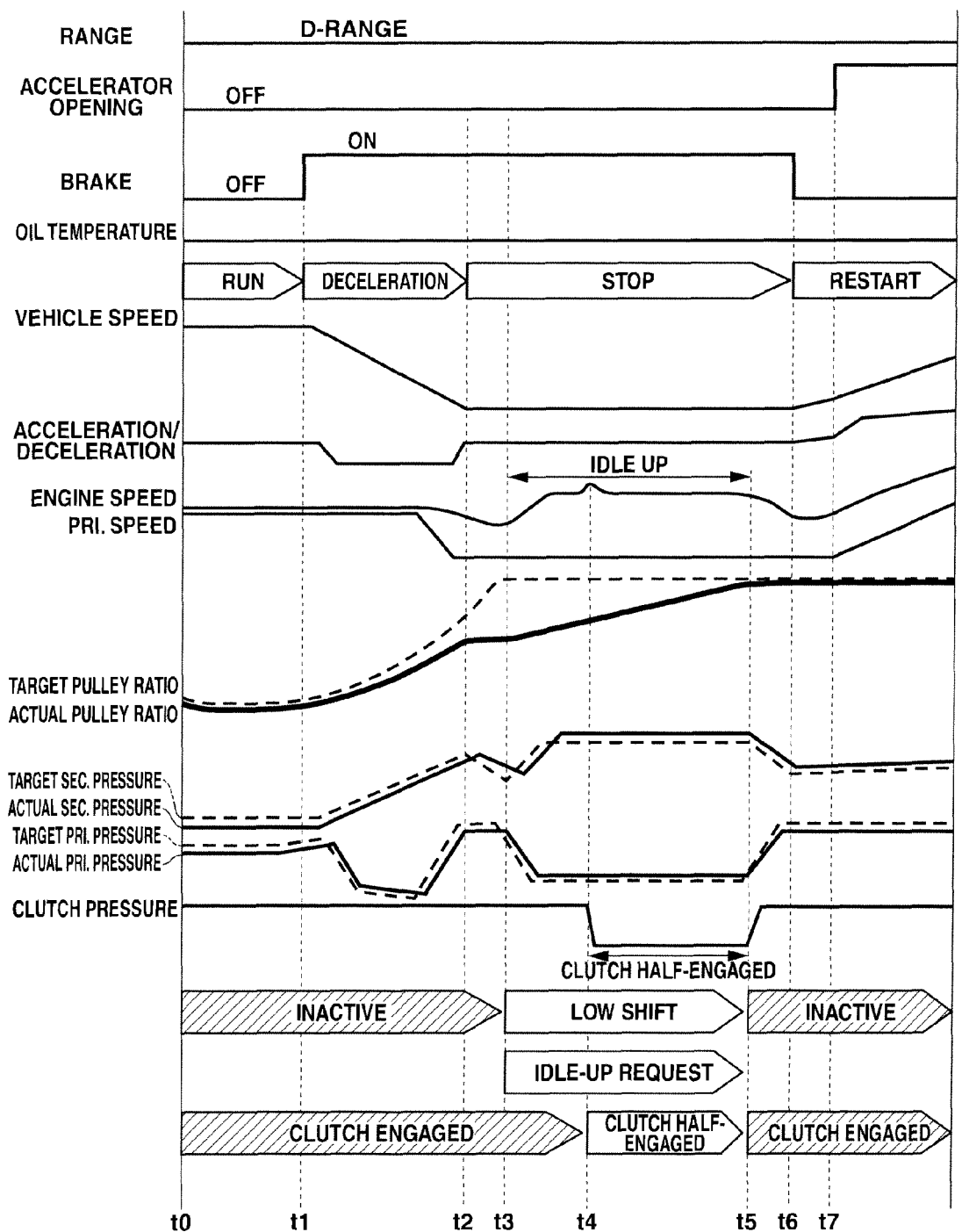
FIG. 5 is a time chart which explains operations of the vehicle-stop LOW shift control started in a HIGH region according to the first embodiment, and which shows respective characteristics of the range position, the accelerator opening, the brake, an oil temperature, the vehicle speed, the acceleration/deceleration, an engine speed, a primary-pulley speed, the target pulley ratio, the actual pulley ratio, a target secondary pressure, an actual secondary pressure, a target primary pressure, an actual primary pressure and a clutch pressure.

Now, the operations of the vehicle-stop LOW shift control which is started in the HIGH region will be explained based on a time chart of FIG. 5 showing a pattern of running (moving)→deceleration→stop→restart.

The accelerator is turned off (ON→OFF) during the vehicle running at timing t0, and the brake is turned on (OFF→ON) at timing t1. Thereby, the vehicle starts to be decelerated from time t1. Then, the vehicle actually stops at timing t2, and it is determined that the vehicle has stopped at timing t3. Concurrently at timing t3, the vehicle-stop LOW shift control is started to conduct the LOW shift and the idle-speed increasing request. By the vehicle-stop LOW shift control, the actual pulley ratio rises toward the target pulley ratio (toward the LOWEST pulley ratio) after timing t3, as shown by an actual-pulley-ratio characteristic of FIG. 5.

Next, when it is determined that the pulley ratio is in the LOW region at timing t4, the vehicle-stop LOW shift control is started which adds the clutch half-engagement to the LOW shift and the idle-speed increasing request. Thereby, the circumferential slip is suppressed which damages the primary pulley 42 and the belt 44. Then, when the actual pulley ratio reaches the target pulley ratio at timing t5, the vehicle-stop LOW shift aborting control (the pulley LOW shift aborting, the engine idle-speed normal-state returning and the clutch engaging) is started.

Next, the brake is turned off (ON→OFF) at timing t6, the vehicle starts moving by a creep torque of the torque converter 2 as shown by a vehicle-speed characteristic of FIG. 5. Then, when the accelerator is turned on (OFF→ON) at timing t7, the vehicle speed rises in response to the increases of the engine rotational speed and the primary-pulley rotational speed while keeping the actual pulley ratio equal to the target pulley ratio. Accordingly, a favorable acceleration performance of vehicle restart can be secured.

In the vehicle-stop LOW shift control which is carried out from timing t3 to timing t5, a reason why the idle-speed increasing request of engine 1 is added to the LOW shift in which the primary pressure Ppri and the secondary pressure Psec are controlled will now be explained.

When the engine rotational speed (number of revolutions) Ne is increased, the input torque to the primary pulley 42 is increased. Thereby, the kinetic friction force between the primary pulley 42 and the belt 44 is further reduced. Thereby, an amount of the minute slip is increased between the primary pulley 42 and the belt 44 (however, this is not the "circumferential slip"). Therefore, a time length between the start time of the vehicle-stop LOW shift control and the attainment time of the LOWEST region is further shortened as compared with the case where the LOW shift is performed only by the hydraulic control of the primary pressure Ppri and the secondary pressure Psec. That is, the reason why the idle-speed increasing request of engine 1 is employed in the vehicle-stop LOW shift control is that the progress of the LOW shift can be promoted by the further reduction of kinetic friction force.

In the above-mentioned earlier technology (US Patent Application Publication No. 2002-072441), it is a structural object for the promotion of the LOW shift control to forcibly move the belt by increasing the belt sandwiching pressure. That is, in order to increase the belt sandwiching pressure, the engine rotational-speed Ne is increased, i.e., the rotation (discharge pressure) of oil pump is increased. Contrary to such an earlier technology, in the first embodiment according to the present invention, it is a structural object for the promotion of the LOW shift control to reduce the kinetic friction force between the primary pulley 42 and the belt 44. That is, the engine rotational-speed Ne is increased in order to reduce the kinetic friction force, i.e., in order to increase the input torque of the primary pulley 42. This is entirely different from the structure of earlier technology.

Moreover, in the vehicle-stop LOW shift control which is carried out from timing t4 to timing t5, a reason why the clutch half-engagement is added to the LOW shift and the idle-speed increasing request will now be explained.

When the pulley ratio is in the HIGH region, a sufficient belt clamping force in the primary pulley 42 is secured because the contact radius between the primary pulley 42 and the belt 44 is large. However, as the pulley ratio gradually varies from the HIGH region toward LOW side, the contact radius between the primary pulley 42 and the belt 44 becomes more decreased to further reduce the belt clamping force in the primary pulley 42. At this time, if the input torque of the primary pulley 42 is maintained at a constant level, a relation where the belt clamping force is greater than or equal to the input torque of the primary pulley 42 (belt clamping force≥input torque) is gradually changed into a relation where the belt clamping force is smaller than the input torque of the primary pulley 42 (belt clamping force<input torque). With this relation change, the minute-slip state between the primary pulley 42 and the belt 44 is gradually changed into the circumferential-slip state between the primary pulley 42 and the belt 44.

Therefore, a timing when the relation where the belt clamping force is smaller than the input torque of the primary pulley 42 (belt clamping force<input torque) is on the verge of being realized (satisfied) is determined by monitoring the pulley ratio. At this determined timing (if it is determined that the pulley ratio is in the LOW region), the forward clutch 31 is set in the half-engaged state. By this half-engagement control for the forward clutch 31, the power-transfer amount from the engine 1 and the torque converter 2 is limited by the forward clutch 31, so that the input torque of the primary pulley 42 can be reduced. By the reduction of the input torque of the primary pulley 42, the relation where the belt clamping force is greater than or equal to the input torque of the primary pulley 42 (belt clamping force≥input torque) can be maintained or re-realized without realizing the relation where the belt clamping force is smaller than the input torque of the primary pulley 42 (belt clamping force<input torque).

That is, a first reason why the clutch half-engagement is employed in the vehicle-stop LOW shift control is that the relation state where the belt clamping force is greater than or equal to the input torque (belt clamping force≥input torque) can be maintained in the primary pulley 42. Thereby, the circumferential slip of the belt 44 is prevented so that the damage of the belt 44 and the primary pulley 42 can be prevented. A second reason why the clutch half-engagement is employed in the vehicle-stop LOW shift control is that the restart acceleration-performance of the vehicle can be enhanced during the vehicle-stop LOW shift control because the forward clutch 31 is not completely released.

[Operations of Vehicle-Stop LOW Shift Control Which is Started in LOW Region]

In the case that the vehicle-stop LOW shift control is started when the pulley ratio is in the LOW region, it is necessary to suppress the circumferential slip of the belt 44 while executing the LOW shift control. Operations of the vehicle-stop LOW shift control which is started in the LOW region will now be explained.

In the case that the start condition of the vehicle-stop LOW shift control is satisfied when the pulley ratio is in the LOW region, a flow proceeding as step S1→step S2→step S3→step S6→RETURN in the flowchart of FIG. 2 is repeated. That is, at step S6, the clutch half-engagement control, the engine idle-speed increasing control and the pulley LOW shift control are executed as the vehicle-stop LOW shift control.

Then, when the pulley ratio reaches the LOWEST region because of the execution of the vehicle-stop LOW shift control, a flow proceeding as step S1→step S2→step S4→RETURN in the flowchart of FIG. 2 is repeated. That is, at step S4, the pulley LOW shift aborting control, the engine idle-speed normal-state returning control and the clutch engaging control are carried out as the vehicle-stop LOW shift aborting control.

Moreover, if the driver releases the brake(-pedal) according to his vehicle-restart intention after the vehicle-stop LOW shift control, the program proceeds as step S1→step S4 in the flowchart of FIG. 2. When the vehicle-stop LOW shift aborting control of step S4 has been completed, the normal pulley-ratio shift control is carried out to cause the actual pulley ratio to follow the target pulley ratio.

Figure 6:
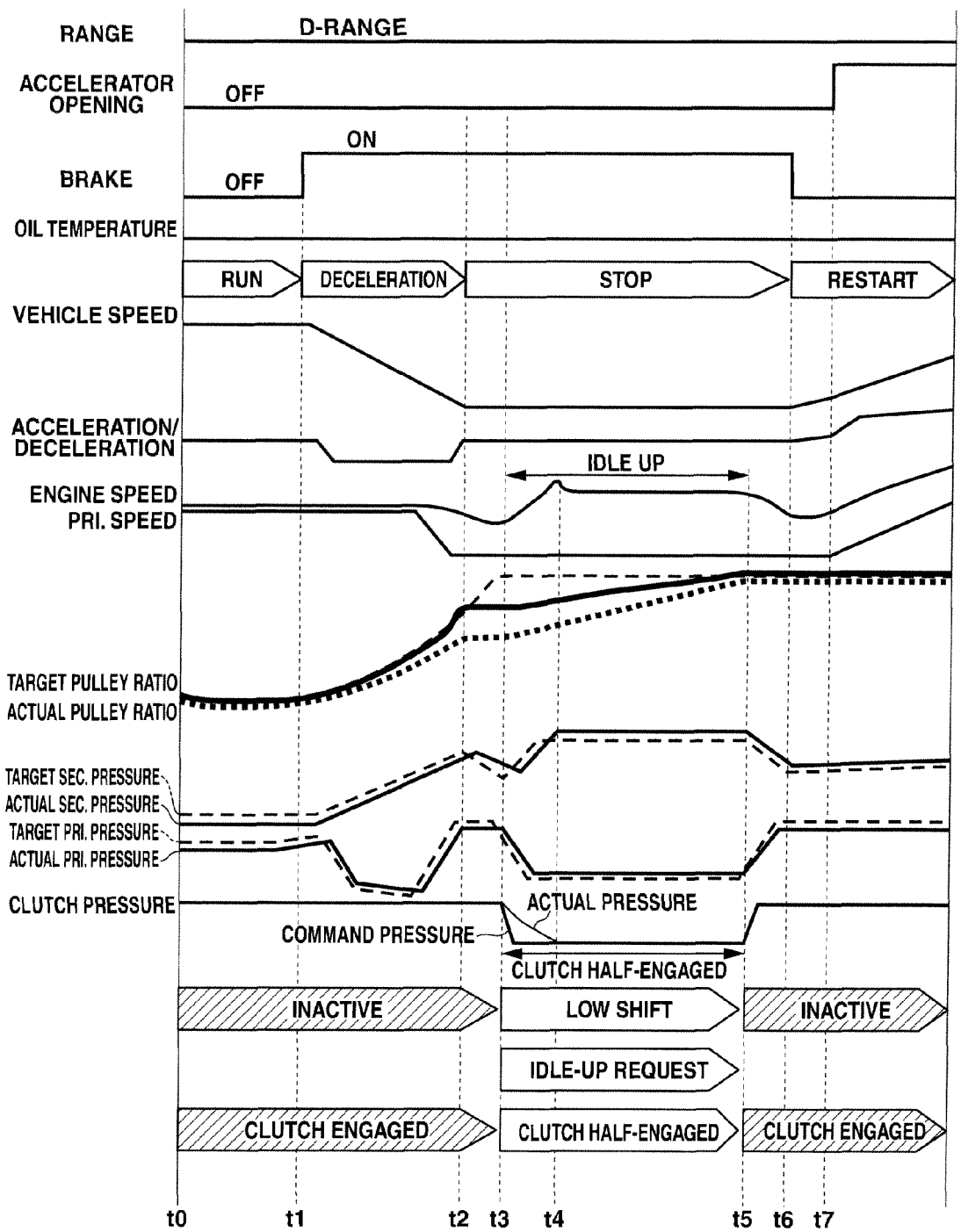
FIG. 6 is a time chart which explains operations of the vehicle-stop LOW shift control started in a LOW region according to the first embodiment, and which shows respective characteristics of the range position, the accelerator opening, the brake, the oil temperature, the vehicle speed, the acceleration/deceleration, the engine speed, the primary-pulley speed, the target pulley ratio, the actual pulley ratio, the target secondary pressure, the actual secondary pressure, the target primary pressure, the actual primary pressure and the clutch pressure.

Now, the operations of the vehicle-stop LOW shift control which is started in the LOW region will be explained based on a time chart of FIG. 6 showing a pattern of running (moving)→deceleration→stop→restart.

The accelerator is turned off (ON→OFF) during the vehicle running at timing to, and the brake is turned on (OFF→ON) at timing t1. Thereby, the vehicle starts to be decelerated from time t1. Then, the vehicle actually stops at timing t2, and it is determined that the vehicle has stopped at timing t3. Concurrently at timing t3, the vehicle-stop LOW shift control is started to conduct the LOW shift, the idle-speed increasing request and the clutch half-engagement. By the vehicle-stop LOW shift control, the actual pulley ratio rises toward the target pulley ratio (LOWEST pulley ratio) after timing t3, as shown by an actual-pulley-ratio characteristic of FIG. 6.

Next, when the actual pulley ratio reaches the target pulley ratio at timing t5, the vehicle-stop LOW shift aborting control (the pulley LOW shift aborting, the engine idle-speed normal-state returning and the clutch engaging) is started. Then, the brake is turned off (ON→OFF) at timing t6, the vehicle starts moving by the creep torque of the torque converter 2 as shown by a vehicle-speed characteristic of FIG. 6. Then, when the accelerator is turned on (OFF→ON) at timing t7, the vehicle speed rises in response to the increases of the engine rotational speed and the primary-pulley rotational speed while keeping the actual pulley ratio equal to the target pulley ratio. Accordingly, a favorable acceleration performance of vehicle restart can be ensured.

In the vehicle-stop LOW shift control which is started in the LOW region, a reason why the clutch half-engagement control is started concurrently with the start of the vehicle-stop LOW shift control that conducts the LOW shift and the idle-speed increasing request will now be explained.

In order to suppress the circumferential slip of the belt 44 in the side of primary pulley 42 in the LOW region, it is necessary to reduce the power-transfer amount of the forward clutch 31 and thereby to reduce the input torque to the primary pulley 42.

However, there is a time lag between a half-engagement command for the forward clutch 31 and an actual attainment of half-engaged state of the forward clutch 31. That is, as shown in FIG. 6, an actual-pressure characteristic of the forward clutch 31 decreases with a delay relative to a command-pressure characteristic for the forward clutch 31. That is, a responsivity of the half-engagement command for the forward clutch 31 is different from a responsivity of the actual attainment of half-engaged state of the forward clutch 31. Therefore, by outputting the half-engagement command for the forward clutch 31 concurrently with the start of the LOW shift control toward LOWEST region, the forward clutch 31 remains in the power-transferring state for a while after the start of shift toward LOWEST region, and then, the forward clutch 31 becomes in the half-engaged state. Therefore, in an initial stage of the shift toward LOWEST region, the shift is promoted by the torque inputted to the primary pulley 42. Then, the forward clutch 31 changes its state into the half-engaged state so as to prevent the circumferential slip of the belt 44.

That is, the reason why the clutch half-engagement control is started concurrently with the start of the vehicle-stop LOW shift control is that the circumferential slip of the belt 44 can be suppressed while executing the shift toward LOWEST region without using any complicated control for the above-mentioned time lag of clutch control.

Next, advantageous effects according to the present invention will now be explained. The following listed advantageous effects can be obtained in the control apparatus for the engine vehicle equipped with belt-type continuously-variable transmission in the first embodiment.

(1) The control apparatus includes the drive source (engine 1); the continuously-variable transmitting mechanism (belt-type continuously-variable transmission 4) including the primary pulley 42, the secondary pulley 43, and the power transferring member (belt 44) wound around the primary pulley 42 and the secondary pulley 43; the friction engagement element (forward clutch 31) provided in the drive-force transfer system between the drive source (engine 1) and the belt-type continuously-variable transmitting mechanism 4; and the vehicle-stop LOW shift control section or means (FIG. 2). The power-transferring state of the friction engagement element (forward clutch 31) is controlled by the engaging-force control for the friction engagement element (forward clutch 31). The vehicle-stop LOW shift control section includes the vehicle-stop judging section or means (step S1) configured to judge whether or not the vehicle is in a stopped state. Moreover, the vehicle-stop LOW shift control section starts the vehicle-stop LOW shift control to shift the pulley ratio of the belt-type continuously-variable transmitting mechanism 4 toward LOW side when the vehicle-stop judging section (S1) determines that the vehicle is in the stopped state under the power-transferring state where the friction engagement element (forward dutch 31) is in an engaged state and also when the pulley ratio is not in the LOWEST region. Accordingly, the time length necessary to bring the pulley ratio into the LOWEST state can be shortened at the time of vehicle stop. In addition, if the request of vehicle restart occurs during the vehicle-stop LOW shift control, the restart acceleration-performance can be improved.

(2) The vehicle-stop LOW shift control section (FIG. 2) sets a pulley-ratio threshold value at which the input torque of the belt-type continuously-variable transmitting mechanism 4 becomes larger than the belt clamping force (clamping force of the power transferring member) under the power-transferring state where the friction engagement element (forward clutch 31) is in the engaged state, as a predetermined value. Moreover, the vehicle-stop LOW shift control section (FIG. 2) starts the half-engagement control (step S6) to reduce the power-transfer amount of the friction engagement element (forward clutch 31) when the pulley ratio of the belt-type continuously-variable transmitting mechanism 4 becomes larger than or equal to the predetermined value during the execution of the vehicle-stop LOW shift control which is shifting the pulley ratio toward LOW side (at the time of YES of step S3). Accordingly, in addition to the above-mentioned advantageous effects (1), the generation of circumferential slip can be reduced which is caused due to a shortage of the belt clamping force relative to the input torque of the primary pulley 42. Therefore, the damage of the primary pulley 42 and the belt 44 can be reduced.

(3) The vehicle-stop LOW shift control section (FIG. 2) reduces the power-transfer amount of the friction engagement element (forward clutch 31) down to a power-transfer-amount level which causes the input torque of the belt-type continuously-variable transmitting mechanism 4 to become smaller than or equal to the belt clamping force under a state where the pulley ratio is in the LOWEST region. (step S6-1) Accordingly, in addition to the above-mentioned advantageous effects (2), the circumferential slip which is caused due to a shortage of the belt clamping force relative to the input torque of the primary pulley 42 can be prevented from being generated. Therefore, the damage of the primary pulley 42 and the belt 44 can be prevented. Moreover, the acceleration-performance of vehicle restart can be enhanced during the execution of the vehicle-stop LOW shift control since the friction engagement element (forward clutch 31) is not completely disengaged.

(4) The vehicle-stop LOW shift control section (FIG. 2) sets a pulley-ratio threshold value at which the input torque of the belt-type continuously-variable transmitting mechanism 4 becomes larger than the belt clamping force under the power-transferring state where the friction engagement element (forward clutch 31) is in the engaged state, as a predetermined value. The vehicle-stop LOW shift control section (FIG. 2) starts a half-engagement control to reduce the power-transfer amount of the friction engagement element (forward clutch 31) concurrently with a start of the shift control toward LOW side, if the pulley ratio of the belt-type continuously-variable transmitting mechanism 4 is larger than or equal to the set predetermined value when the start condition of the vehicle-stop LOW shift control is satisfied. Accordingly, in addition to the above-mentioned advantageous effects (1), a time lag existing between a half-engagement-command timing for the friction engagement element (forward clutch 31) and an actual-attainment timing of half-engaged state of the friction engagement element (forward clutch 31) is taken into consideration, so that the vehicle-stop LOW shift control can be promoted with the circumferential slip of the belt 44 suppressed, without using any complicated control.

(5) The vehicle-stop LOW shift control section (FIG. 2) shifts the pulley ratio toward LOW side by enlarging the belt sandwiching force in the secondary pulley 43 more than the belt sandwiching force in the primary pulley 42. Accordingly, in addition to the above-mentioned advantageous effects (1) to (4), the pulley ratio of the belt-type continuously-variable transmitting mechanism 4 can be properly shifted toward LOW-speed side.

(6) The vehicle-stop LOW shift control section (FIG. 2) shifts the pulley ratio toward LOW side by bringing the secondary pressure Psec for the secondary pulley 43 to the line pressure PL that is the maximum pressure among unit hydraulic-pressures of the control apparatus and by bringing the primary pressure Psec for the primary pulley 42 to the drain pressure. Accordingly, in addition to the above-mentioned advantageous effects (5), the progression speed at which the pulley ratio of the belt-type continuously-variable transmitting mechanism 4 is shifted (varied) toward LOW side can be made fast.

(7) The vehicle-stop LOW shift control section (FIG. 2) carries out the drive-source rotational-speed increasing control to increase the rotational speed of the drive source (engine 1) obtained when the vehicle-stop judging section (step S1) determines that the vehicle is in the stopped state, when the LOW shift control that shifts the pulley ratio toward LOW side is being carried out. Accordingly, in addition to the above-mentioned advantageous effects (1) to (6), the kinetic friction force between the primary pulley 42 and the belt 44 can be reduced. Hence, a time length needed until the pulley ratio becomes in the LOWEST region from the start timing of the vehicle-stop LOW shift control can be shortened as compared with a case where the drive-source rotational-speed increasing control is not performed.

(8) The vehicle-stop LOW shift control section (FIG. 2) starts the drive-source rotational-speed increasing control concurrently when starting the LOW shift control with the satisfaction of start condition of the vehicle-stop LOW shift control. Accordingly, in addition to the above-mentioned advantageous effects (7), a time length needed until the pulley ratio becomes in the LOWEST region from the vehicle-stop timing can be shortened as compared with a case where the drive-source rotational-speed increasing control is started after the start of the LOW shift control.

(9) The vehicle-stop LOW shift control section (FIG. 2) includes the circumferential-slip predicting section configured to predict whether or not the circumferential slip between the primary pulley 42 and the belt 44 will occur during the vehicle-stop LOW shift control that shifts the pulley ratio toward LOW side. Moreover, the vehicle-stop LOW shift control section (FIG. 2) aborts the shift toward LOW side if the circumferential-slip predicting section predicts that the circumferential slip will occur. (step S6) Accordingly, in addition to the above-mentioned advantageous effects (1) to (8), the damage of the primary pulley 42 and the belt 44 in the belt-type continuously-variable transmitting mechanism 4 is suppressed to the minimum so that protection and durability of the primary pulley 42 and the belt 44 can be ensured.

(10) The circumferential-slip predicting section predicts whether or not the circumferential slip will occur, based on a variation amount of rotational speed of the primary pulley 42. For example, the circumferential-slip predicting section predicts that the circumferential slip will occur when the variation amount of rotational speed of the primary pulley 42 is larger than a prescribed amount. Therefore, it can be predicted whether or not the circumferential slip will occur with high accuracy, in addition to the above-mentioned advantageous effects (9).

Second Embodiment

In a second embodiment according to the present invention, the engine idle-speed increasing control is omitted from the vehicle-stop LOW shift control.

Figure 7:
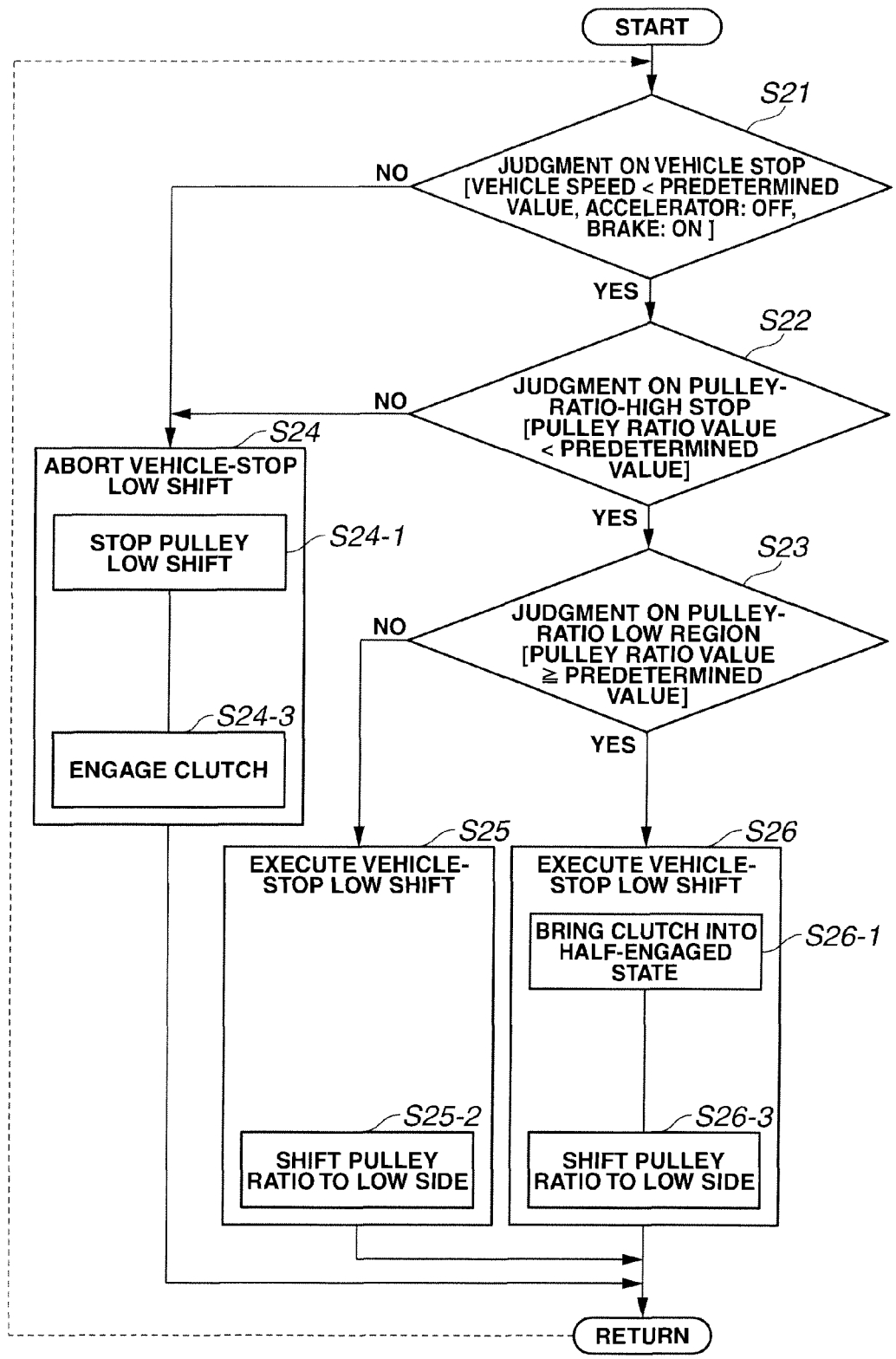
FIG. 7 is a flowchart showing flow and configuration of processing of a vehicle-stop LOW shift control which is executed by the CVT control unit in a second embodiment according to the present invention.

At first, a configuration will now be explained. FIG. 7 is a flowchart (vehicle-stop LOW shift control means or section) showing flow and configuration of processing of the vehicle-stop LOW shift control which is executed by the CVT control unit 8 in the second embodiment. Respective steps of FIG. 7 will now be explained. Since step S21, step S22 and step S23 of FIG. 7 are same as step S1, step S2 and step S3 of FIG. 2, explanations thereof will be omitted for purpose of simplification of the disclosure.

At step S24 subsequent to step S21 or step S22, the control unit (the CVT control unit 8) carries out a vehicle-stop LOW shift aborting control in a case that the vehicle-stop LOW shift control (the pulley LOW shift control and/or the clutch half-engagement control) is currently being carried out. Then, the program is returned. This vehicle-stop LOW shift aborting control includes the following two controls.

At step S24-1, the pulley LOW shift aborting control is carried out. That is, when the pulley LOW shift control is in execution, the pulley LOW shift control is aborted or terminated so that the normal pulley-ratio shift control is resumed.

At step S24-3, the clutch engaging control is carried out. That is, when the half-engagement control that reduces the clutch engaging oil-pressure of the forward clutch 31 is in execution, the clutch engaging oil-pressure of the forward clutch 31 is returned in the normal state where the forward clutch 31 causes no slip against its input torque.

At step S24, in a case that the vehicle-stop LOW shift control is not currently in execution, the control unit maintains the normal pulley-ratio shift control and the normal dutch engaging control.

At step S25 subsequent to step S23, the control unit carries out a vehicle-stop LOW shift control (the pulley LOW shift control). Then, the program is returned. At step 25, the vehicle-stop LOW shift control is performed before the pulley ratio reaches the LOW region, and is performed by means of a single control of the pulley LOW shift control. That is, at step S25-2, the pulley LOW shift control is carried out. In detail, the secondary pressure Psec is brought to the line pressure PL, and the primary pressure Ppri is brought to the drain pressure, so that the pulley ratio of the belt-type continuously-variable transmitting mechanism 4 is varied toward LOW side (LOW-speed side).

At step S26 subsequent to step S23, the control unit carries out a vehicle-stop LOW shift control (the clutch half-engagement control and the pulley LOW shift control). Then, the program is returned. At step 26, the vehicle-stop LOW shift control is performed after the pulley ratio has reached the LOW region, and is performed by means of a cooperative control between LOW shift control and clutch control. This vehicle-stop LOW shift control of step S26 includes the following two controls.

At step S26-1, the clutch half-engagement control is carried out. That is, the power transfer amount of the forward clutch 31 is reduced down to a power-transfer-amount level which causes the input torque of the belt-type continuously-variable transmitting mechanism 4 to become smaller than or equal to the belt clamping force under the LOWEST(-speed) pulley ratio.

At step S26-3, the pulley LOW shift control is carried out. This step S26-3 is similar as step S25-2.

Since a schematic system configuration in the second embodiment is similar as that (FIG. 1) in the first embodiment, illustrations and explanations thereof will be omitted for purpose of simplification of the disclosure.

Next, operations of the vehicle-stop LOW shift control which is started in the HIGH region will now be explained according to the second embodiment. In the case that the start condition (criterion) of the vehicle-stop LOW shift control is satisfied when the pulley ratio is in the HIGH region, a flow proceeding as step S21→step S22→step S23→step S25→RETURN in the flowchart of FIG. 7 is repeated. That is, at step S25, the pulley LOW shift control is executed as the vehicle-stop LOW shift control.

Then, when it is determined that the pulley ratio is in the LOW region at step S23 because of the progress of the vehicle-stop LOW shift control, a flow proceeding as step S21→step S22→step S23→step S26→RETURN in the flowchart of FIG. 7 is repeated. That is, at step S26, the clutch half-engagement control and the pulley LOW shift control are executed as the vehicle-stop LOW shift control.

Then, when the pulley ratio reaches the LOWEST region because of the execution of the vehicle-stop LOW shift control, a flow proceeding as step S21→step S22→step S24→RETURN in the flowchart of FIG. 7 is repeated. That is, at step S24, the pulley LOW shift aborting control and the clutch engaging control are executed as the vehicle-stop LOW shift aborting control.

Moreover, if the driver releases the brake(-pedal) according to his vehicle-restart intention after the vehicle-stop LOW shift control, the program proceeds as step S21→step S24 in the flowchart of FIG. 7. When the vehicle-stop LOW shift aborting control of step S24 has been completed, the normal pulley-ratio shift control is executed to cause the actual pulley ratio to follow the target pulley ratio.

Figure 8:
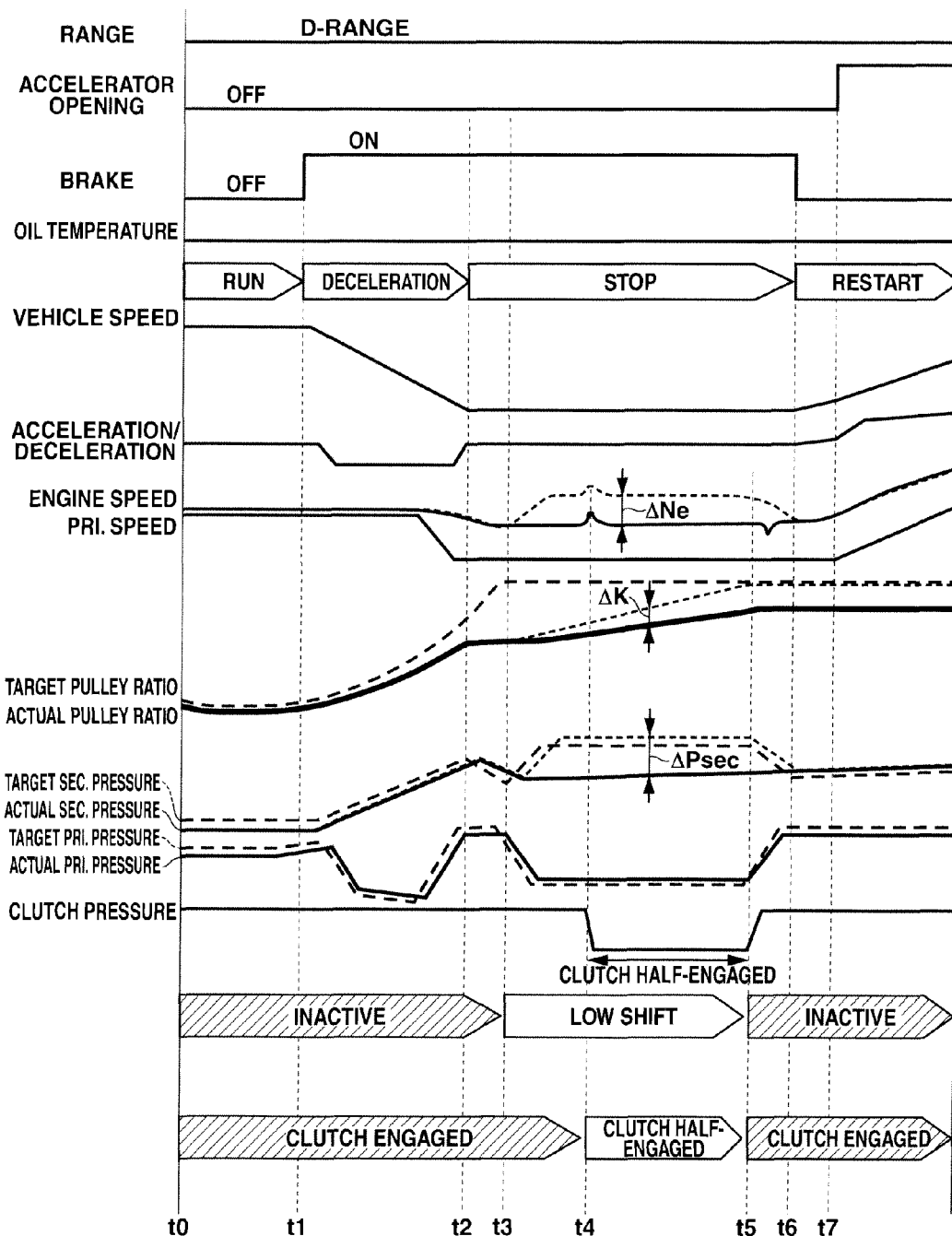
FIG. 8 is a time chart which explains operations of the vehicle-stop LOW shift control started in the HIGH region according to the second embodiment, and which shows respective characteristics of the range position, the accelerator opening, the brake, the oil temperature, the vehicle speed, the acceleration/deceleration, the engine speed, the primary-pulley speed, the target pulley ratio, the actual pulley ratio, the target secondary pressure, the actual secondary pressure, the target primary pressure, the actual primary pressure and the clutch pressure.

Now, the operations of the vehicle-stop LOW shift control which is started in the HIGH region will be explained based on a time chart of FIG. 8 showing a pattern of running (moving)→deceleration→stop→restart.

The accelerator is turned off (ON→OFF) during the vehicle running at timing t0, and the brake is turned on (OFF→ON) at timing t1. Thereby, the vehicle starts to be decelerated from time t1. Then, the vehicle actually stops at timing t2, and it is determined that the vehicle has stopped at timing t3. Concurrently at timing t3, the vehicle-stop LOW shift control is started to conduct the LOW shift. By this vehicle-stop LOW shift control, the actual pulley ratio rises toward the target pulley ratio (toward the LOWEST pulley ratio) after timing t3, as shown by an actual-pulley-ratio characteristic of FIG. 8.

Next, when it is determined that the pulley ratio is in the LOW region at timing t4, the vehicle-stop LOW shift control is started which adds the clutch half-engagement to the LOW shift. Thereby, the circumferential slip is suppressed which damages the primary pulley 42 and the belt 44. Then, when the actual pulley ratio reaches the target pulley ratio at timing t5, the vehicle-stop LOW shift aborting control (the pulley LOW shift aborting and the clutch engaging) is started.

Next, the brake is turned off (ON→OFF) at timing t6, the vehicle starts moving by the creep torque of the torque converter 2 as shown by a vehicle-speed characteristic of FIG. 8. Then, when the accelerator is turned on (OFF→ON) at timing t7, the vehicle speed rises in response to the increases of the engine rotational speed and the primary-pulley rotational speed while keeping the actual pulley ratio. Accordingly, a favorable acceleration performance of vehicle restart can be secured.

In the vehicle-stop LOW shift control which is carried out from timing t3 to timing t5, the idle-speed increasing request of engine 1 is not added to the LOW shift in which the primary pressure Ppri and the secondary pressure Psec are controlled, in this second embodiment. A difference from the first embodiment, which is produced by no addition of the idle-speed increasing request will now be explained.

As shown by an engine-speed characteristic of FIG. 8, an engine rotational-speed difference $\Delta Ne$ is generated between in the case that the engine idle-speed increasing control is executed and in the case that the engine idle-speed increasing control is not executed.

Thereby, a discharge oil amount of the oil pump which is driven and rotated by the engine 1 decreases to reduce the line pressure PL. Hence, the secondary pressure Psec (=line pressure PL) for the secondary pulley 43 is reduced by a secondary-pressure difference $\Delta Psec$ as shown by an actual-secondary-pressure characteristic of FIG. 8. The progression speed of the LOW shift is reduced by a pulley-ratio-gradient difference $\Delta k$ as shown by an actual-pulley-ratio characteristic of FIG. 8. Since the other operations are similar as those of the first embodiment, explanations thereof will be omitted for the purpose of simplification of the disclosure.

According to the control apparatus for an engine vehicle equipped with belt-type continuously-variable transmission in the second embodiment, the advantageous effects (1)-(6), (9) and (10) mentioned in the first embodiment can be obtained. Moreover, the circumferential slip which is generated due to the shortage of belt clamping force relative to the input torque of the primary pulley 42 is prevented from occurring, so that the damage of the primary pulley 42 and the belt 44 can be prevented. Moreover, the restart acceleration-performance of the vehicle can be improved during the vehicle-stop LOW shift control because the friction engagement element (forward clutch 31) is not completely released.

Third Embodiment

In a third embodiment according to the present invention, the power-transfer amount of the forward clutch 31 is gradually reduced toward a target power-transfer amount for the forward clutch 31 under the clutch half-engagement control.

Figure 9:
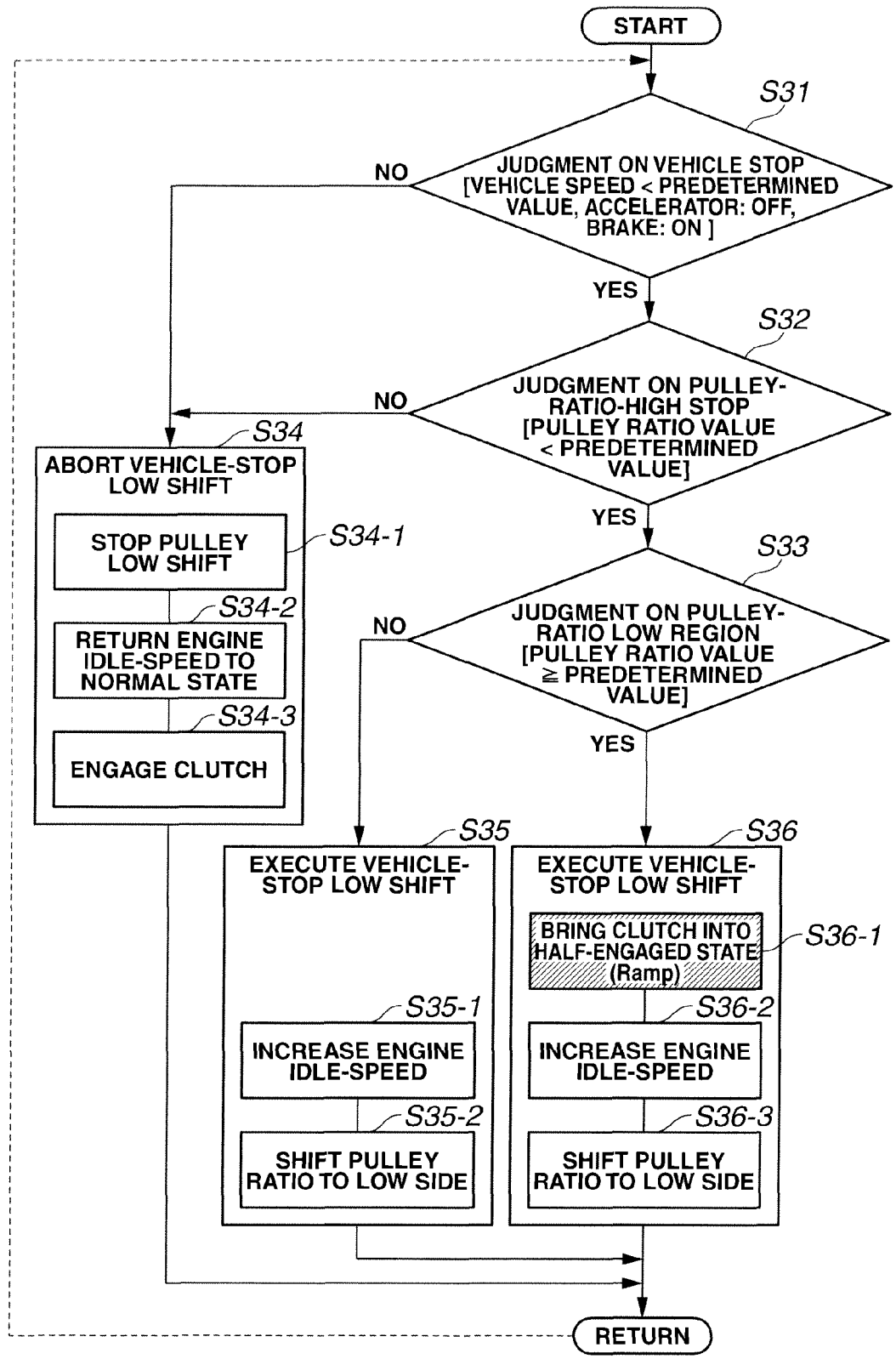
FIG. 9 is a flowchart showing flow and configuration of processing of a vehicle-stop LOW shift control which is executed by the CVT control unit in a third embodiment according to the present invention.

At first, a configuration will now be explained. FIG. 9 is a flowchart (vehicle-stop LOW shift control means or section) showing flow and configuration of processing of the vehicle-stop LOW shift control which is executed by the CVT control unit 8 in the third embodiment. Respective steps of FIG. 9 will now be explained. Since respective steps S31-S35 of FIG. 9 are same as steps S1-S5 of FIG. 2, explanations thereof will be omitted for purpose of simplification of the disclosure.

At step S36 subsequent to step S33, the control unit carries out a vehicle-stop LOW shift control (the clutch half-engagement control, the engine idle-speed increasing control and the pulley LOW shift control). Then, the program is returned. At step 36, the vehicle-stop LOW shift control is performed after the pulley ratio has reached the LOW region, and is performed by means of a cooperative control among LOW shift control, engine speed control and clutch control. This vehicle-stop LOW shift control includes the following three controls.

At step S36-1, a clutch half-engagement control (a ramp control) is carried out. That is, the power transfer amount of the forward clutch 31 is reduced gradually (relatively-slowly) down to a power-transfer-amount level which causes the input torque of the belt-type continuously-variable transmitting mechanism 4 to become smaller than or equal to the belt clamping force under the LOWEST pulley ratio.

At step S36-2, the engine idle-speed increasing control is carried out. This step S36-2 is similar as step S35-1.

At step S36-3, the pulley LOW shift control is carried out. This step S36-3 is similar as step S35-2.

Since a schematic system configuration in the third embodiment is similar as that (FIG. 1) in the first embodiment, illustrations and explanations thereof will be omitted for purpose of simplification of the disclosure.

Next, operations of the vehicle-stop LOW shift control which is started in the HIGH region will now be explained according to the third embodiment. In the case that the start condition (criterion) of the vehicle-stop LOW shift control is satisfied when the pulley ratio is in the HIGH region, a flow proceeding as step S31→step S32→step S33→step S35→RETURN in the flowchart of FIG. 9 is repeated. That is, at step S35, the engine idle-speed increasing control and the pulley LOW shift control are executed as the vehicle-stop LOW shift control.

Then, when it is determined that the pulley ratio is in the LOW region at step S33 because of the progress of the vehicle-stop LOW shift control, a flow proceeding as step S31→step S32∝step S33→step S36→RETURN in the flowchart of FIG. 9 is repeated. That is, at step S36, the clutch half-engagement control, the engine idle-speed increasing control and the pulley LOW shift control are executed as the vehicle-stop LOW shift control.

Then, when the pulley ratio reaches the LOWEST region because of the execution of the vehicle-stop LOW shift control, a flow proceeding as step S31→step S32→step S34→RETURN in the flowchart of FIG. 9 is repeated. That is, at step S34, the pulley LOW shift aborting control, the engine idle-speed normal-state returning control and the clutch engaging control are executed as the vehicle-stop LOW shift aborting control.

Moreover, if the driver releases the brake(-pedal) according to his vehicle-restart intention after the vehicle-stop LOW shift control, the program proceeds as step S31→step S34 in the flowchart of FIG. 9. When the vehicle-stop LOW shift aborting control of step S34 has been completed, the normal pulley-ratio shift control is executed to cause the actual pulley ratio to follow the target pulley ratio.

Figure 10:
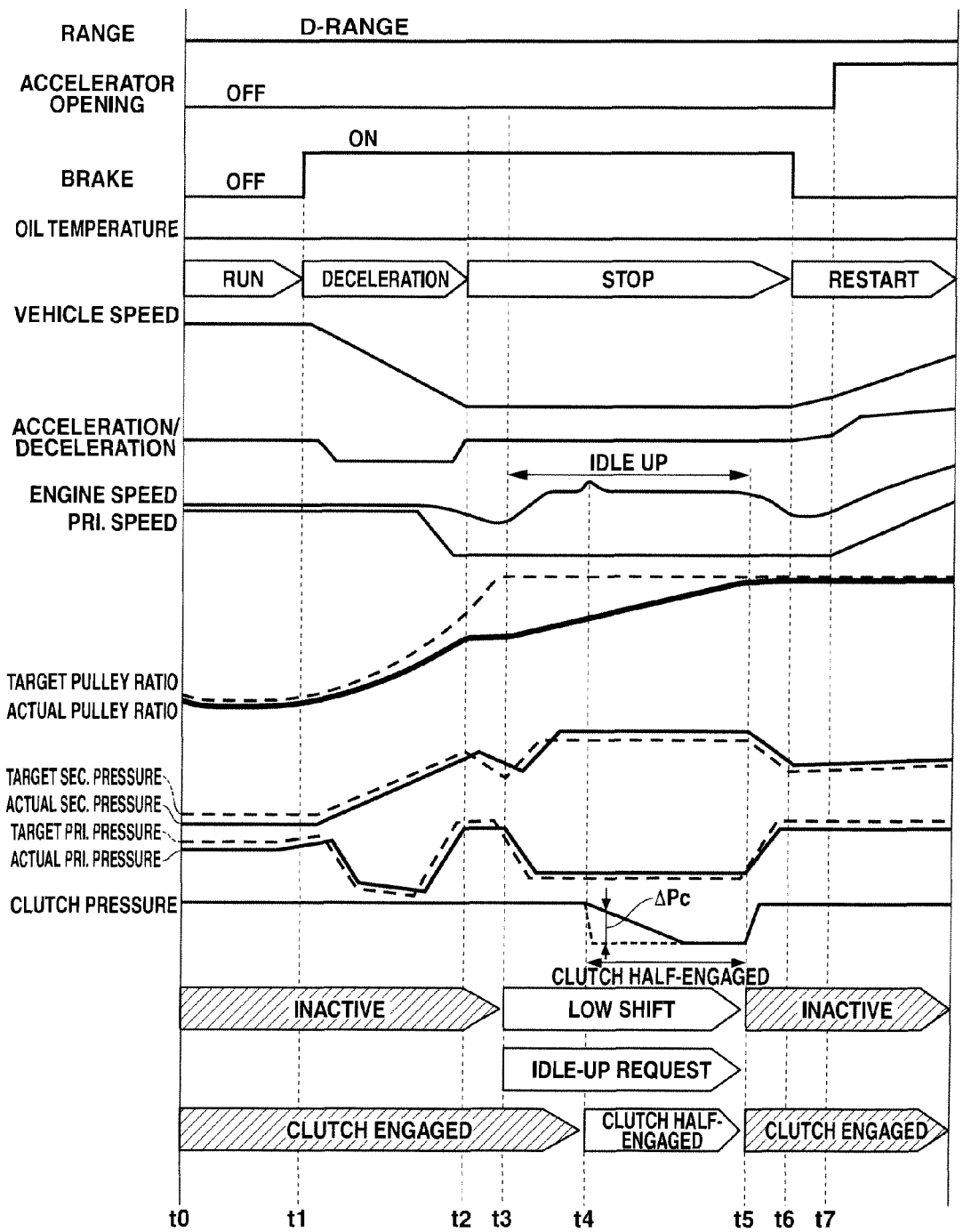
FIG. 10 is a time chart which explains operations of the vehicle-stop LOW shift control started in the HIGH region according to the third embodiment, and which shows respective characteristics of the range position, the accelerator opening, the brake, the oil temperature, the vehicle speed, the acceleration/deceleration, the engine speed, the primary-pulley speed, the target pulley ratio, the actual pulley ratio, the target secondary pressure, the actual secondary pressure, the target primary pressure, the actual primary pressure and the clutch pressure.

Now, the operations of the vehicle-stop LOW shift control which is started in the HIGH region will be explained based on a time chart of FIG. 10 showing a pattern of running (moving)→deceleration→stop→restart.

The accelerator is turned off (ON→OFF) during the vehicle running at timing t0, and the brake is turned on (OFF→ON) at timing t1. Thereby, the vehicle starts to be decelerated from time t1. Then, the vehicle actually stops at timing t2, and it is determined that the vehicle has stopped at timing t3. Concurrently at timing t3, the vehicle-stop LOW shift control is started to conduct the LOW shift and the idle-speed increasing request. By this vehicle-stop LOW shift control, the actual pulley ratio rises toward the target pulley ratio (LOWEST pulley ratio) after timing t3, as shown by an actual-pulley-ratio characteristic of FIG. 10.

Next, when it is determined that the pulley ratio is in the LOW region at timing t4, the vehicle-stop LOW shift control is started which adds the clutch half-engagement to the LOW shift and the idle-speed increasing request. Thereby, the circumferential slip is suppressed which damages the primary pulley 42 and the belt 44. Then, when the actual pulley ratio reaches the target pulley ratio at timing t5, the vehicle-stop LOW shift aborting control (the pulley LOW shift aborting, the engine idle-speed normal-state returning and the clutch engaging) is started.

Next, the brake is turned off (ON→OFF) at timing t6, the vehicle starts moving by the creep torque of the torque converter 2 as shown by a vehicle-speed characteristic of FIG. 10. Then, when the accelerator is turned on (OFF→ON) at timing t7, the vehicle speed rises in response to the increases of the engine rotational speed and the primary-pulley rotational speed while keeping the actual pulley ratio. Accordingly, a favorable acceleration performance of vehicle restart can be secured.

In the vehicle-stop LOW shift control which is carried out from timing t4 to timing t5, the engaging pressure of the forward clutch 31 is gradually reduced with a gentle (slow) downward-gradient as the clutch half-engagement control, in the third embodiment. A difference between this third embodiment and the first embodiment in which the power transfer amount of the forward clutch 31 is reduced rapidly (in one stroke) down to a power-transfer-amount level that causes the input torque of the belt-type continuously-variable transmitting mechanism 4 to become smaller than or equal to the belt clamping force under the LOWEST pulley ratio will now be explained.

At first, a timing when the relation where the belt clamping force is smaller than the input torque of the primary pulley 42 (belt clamping force<input torque) is on the verge of being realized (satisfied) is determined by monitoring the pulley ratio. At this determined timing (if it is determined that the pulley ratio is in the LOW region), the clutch half-engagement control for the forward clutch 31 is started. In an initial stage of this clutch half-engagement control, the power-transfer amount of the forward clutch 31 is slightly reduced. That is, by slightly reducing the input torque of the primary pulley 42, the relation where the belt clamping force is greater than or equal to the input torque of the primary pulley 42 (belt clamping force≥input torque) can be maintained without satisfying the relation where the belt clamping force is smaller than the input torque of the primary pulley 42 (belt clamping force<input torque). In other words, the power-transfer amount of the forward clutch 31 has only to be reduced down to the power-transfer-amount level set for the LOWEST pulley ratio when the pulley ratio has just reached the LOWEST region. Hence, it is not necessary to reduce the power-transfer amount rapidly (in one stroke) down to the power-transfer-amount level set for the LOWEST pulley ratio.

Therefore, the power-transfer amount is reduced gradually with a gentle downward-gradient so as to maintain the relation where the belt clamping force is greater than or equal to the input torque of the primary pulley 42 (belt clamping force≥input torque) in the third embodiment. Accordingly, the circumferential slip of the belt 44 is prevented so that the damage of the belt 44 and the primary pulley 42 can be avoided. Moreover, as shown by a clutch-pressure characteristic of FIG. 10, a clutch-pressure difference ΔPc is kept between the actual clutch-engaging pressure and a finally target clutch-engaging pressure (corresponding to the power-transfer-amount level set for the LOWEST pulley ratio) so that a more sufficient engaged state of the forward clutch 31 is maintained than that of the first embodiment. For example, if the vehicle restart is requested immediately after timing t4, the restart acceleration-performance can be enhanced in the third embodiment. Since the other operations are similar as those of the first embodiment, explanations thereof will be omitted for the purpose of simplification of the disclosure.

Next, advantageous effects will now be explained. According to the control apparatus for an engine vehicle equipped with belt-type continuously-variable transmission in the third embodiment, the following advantageous effects can be obtained.

(11) The vehicle-stop LOW shift control section (FIG. 9) reduces the power-transfer amount of the friction engagement element (forward clutch 31) to a power-transfer-amount level which causes the input torque of the belt-type continuously-variable transmitting mechanism 4 to become smaller than or equal to the belt clamping force, gradually in dependence upon the progress of the shift toward LOW side. Accordingly, the advantageous effects (1), (2) and (4)-(10) mentioned in the first embodiment can be obtained. Moreover, the circumferential slip which is generated due to the shortage of belt clamping force relative to the input torque of the primary pulley 42 is prevented from occurring, so that the damage of the primary pulley 42 and the belt 44 can be prevented. Furthermore, since the engagement degree of the friction engagement element (forward clutch 31) is kept to a maximum extent, the restart acceleration-performance of vehicle can be enhanced even if the restart request of vehicle occurs soon after the start of the vehicle-stop LOW shift control.

Fourth Embodiment

In a fourth embodiment according to the present invention, when the clutch half-engagement control is started, the LOW shift control is temporarily stopped (suspended) until the power-transfer amount reaches its target.

Figure 11:
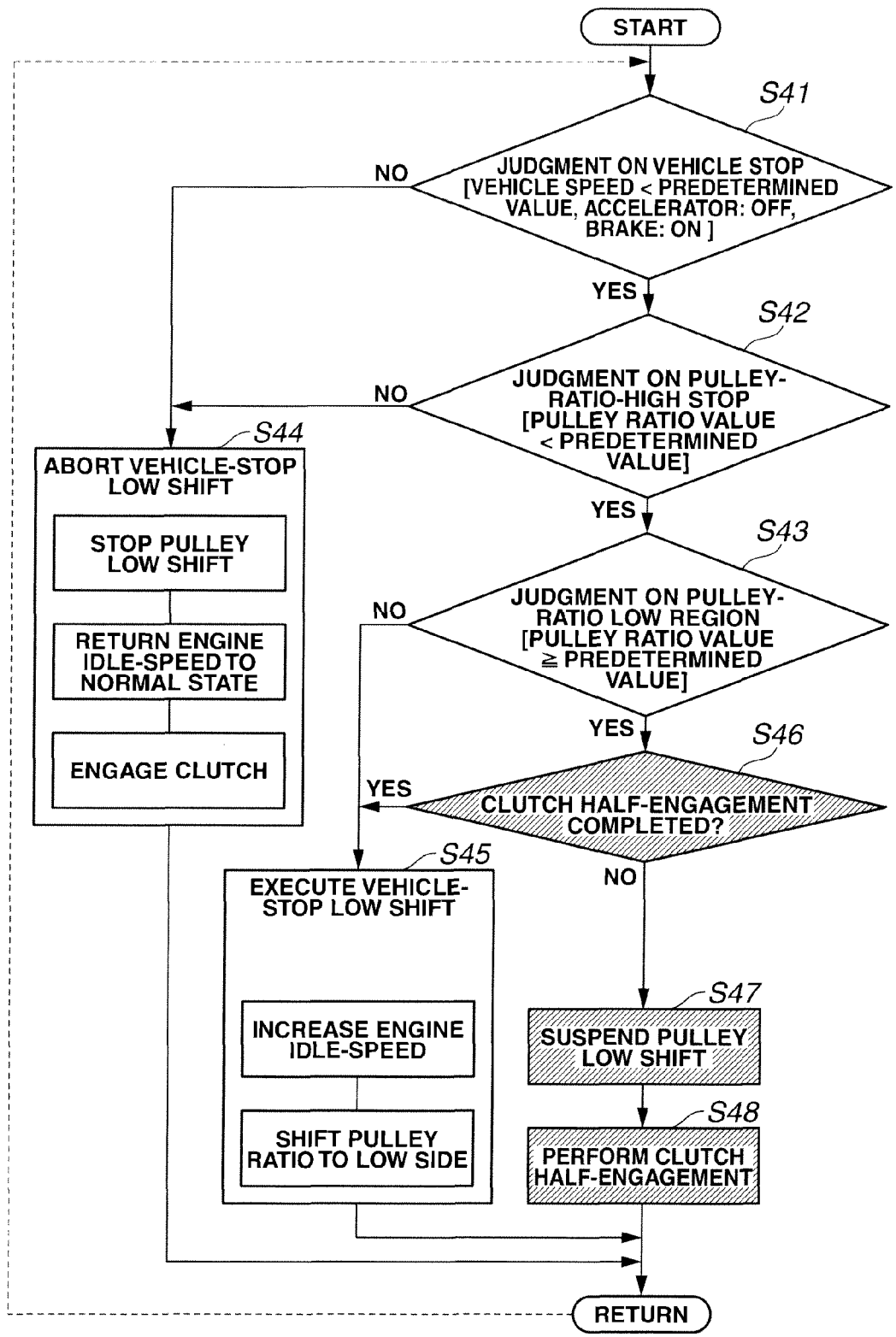
FIG. 11 a flowchart showing flow and configuration of processing of a vehicle-stop LOW shift control which is executed by the CVT control unit in a fourth embodiment according to the present invention.

At first, a configuration in the fourth embodiment will now be explained. FIG. 11 is a flowchart (vehicle-stop LOW shift control means or section) showing flow and configuration of processing of the vehicle-stop LOW shift control which is executed by the CVT control unit 8 in the fourth embodiment. Respective steps of FIG. 11 will now be explained. Since respective steps S41-S45 of FIG. 11 are same as steps S1-S5 of FIG. 2, explanations thereof will be omitted for purpose of simplification of the disclosure.

At step S46 subsequent to step S43, the control unit judges whether or not the power-transfer amount of the forward clutch 31 has reached the target power-transfer amount under the clutch half-engagement control for the clutch 31. If YES at step S46, namely if the clutch half-engagement has been already attained; the program proceeds to step S45. If NO at step S46, namely if the clutch half-engagement has not yet been completed; the program proceeds to step S47.

At step S47 subsequent to step S46, the control unit suspends the pulley LOW shift control. Then, the program proceeds to step S48.

At step S48 subsequent to step S47, the control unit carries out the clutch half-engagement control. Then, the program is returned. In this clutch half-engagement control of step S48, the power-transfer amount of the forward clutch 31 is reduced in a stepwise manner down to the power-transfer-amount level which causes the input torque of the belt-type continuously-variable transmitting mechanism 4 to become smaller than or equal to the belt clamping force under the LOWEST (-speed) pulley ratio, in the same manner as the first embodiment.

Since a schematic system configuration in the fourth embodiment is similar as that (FIG. 1) in the first embodiment, illustrations and explanations thereof will be omitted for purpose of simplification of the disclosure.

Next, operations of the vehicle-stop LOW shift control which is started in the HIGH region will now be explained according to the fourth embodiment. In the case that the start condition (criterion) of the vehicle-stop LOW shift control is satisfied when the pulley ratio is in the HIGH region, a flow proceeding as step S41→step S42→step S43→step S45→RETURN in the flowchart of FIG. 11 is repeated. That is, at step S45, the engine idle-speed increasing control and the pulley LOW shift control are executed as the vehicle-stop LOW shift control.

Then, when it is determined that the pulley ratio is in the LOW region at step S43 because of the progress of the vehicle-stop LOW shift control and it is determined that the half-engagement control of the forward clutch 31 has not yet completed at step S46, a flow proceeding as step S41→step S42→step S43→step S46→step S47→step S48→RETURN in the flowchart of FIG. 11 is repeated. That is, at step S47, the pulley LOW shift control is suspended. At step S48, the clutch half-engagement control is executed.

Then, when the target power-transfer amount is attained because of the execution of the clutch half-engagement control, a flow proceeding as step S41→step S42→step S43→step S46→step S45→RETURN in the flowchart of FIG. 11 is repeated. That is, at step S45, the engine idle-speed increasing control and the pulley LOW shift control are executed under the half-engaged state of forward clutch 31.

Then, when the pulley ratio reaches the LOWEST region because of the execution of the vehicle-stop LOW shift control, a flow proceeding as step S41→step S42→step S44→RETURN in the flowchart of FIG. 11 is repeated. That is, at step S44, the pulley LOW shift aborting control, the engine idle-speed normal-state returning control and the clutch engaging control are executed as the vehicle-stop LOW shift aborting control.

Moreover, if the driver releases the brake(-pedal) according to his vehicle-restart intention after the vehicle-stop LOW shift control, the program proceeds as step S41→step S44 in the flowchart of FIG. 11. When the vehicle-stop LOW shift aborting control of step S44 has been completed, the normal pulley-ratio shift control is executed to cause the actual pulley ratio to follow the target pulley ratio.

Figure 12:
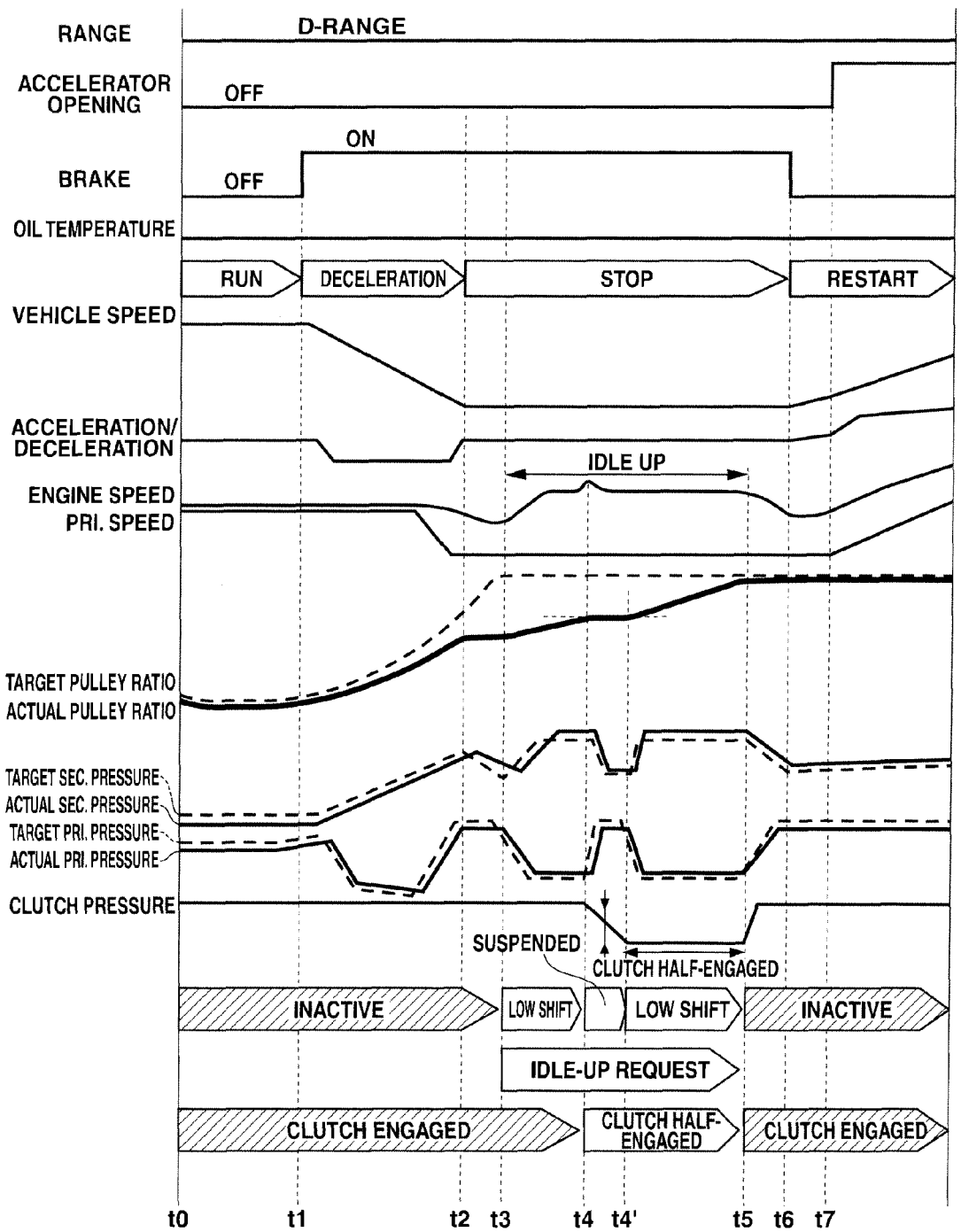
FIG. 12 is a time chart which explains operations of the vehicle-stop LOW shift control started in the HIGH region according to the fourth embodiment, and which shows respective characteristics of the range position, the accelerator opening, the brake, the oil temperature, the vehicle speed, the acceleration/deceleration, the engine speed, the primary-pulley speed, the target pulley ratio, the actual pulley ratio, the target secondary pressure, the actual secondary pressure, the target primary pressure, the actual primary pressure and the clutch pressure.

Now, the operations of the vehicle-stop LOW shift control which is started in the HIGH region will be explained based on a time chart of FIG. 12 showing a pattern of running (moving)→deceleration→stop→restart.

The accelerator is turned off (ON→OFF) during the vehicle running at timing t0, and the brake is turned on (OFF→ON) at timing t1. Thereby, the vehicle starts to be decelerated from time t1. Then, the vehicle actually stops at timing t2, and it is determined that the vehicle has stopped at timing t3. Concurrently at timing t3, the vehicle-stop LOW shift control is started to conduct the LOW shift and the idle-speed increasing request. By this vehicle-stop LOW shift control, the actual pulley ratio rises toward the target pulley ratio (LOWEST pulley ratio) after timing t3, as shown by an actual-pulley-ratio characteristic of FIG. 11.

Next, when it is determined that the pulley ratio is in the LOW region at timing t4, the LOW shift control is suspended, and the clutch half-engagement control is started (It is noted that the idle-speed increasing request is continued). Then, when the target power-transfer amount is attained at timing t4' by execution of the clutch half-engagement control, the LOW shift is restarted by releasing the suspended state of the LOW shift. At this timing t4', the vehicle-stop LOW shift control is started which adds the clutch half-engagement to the LOW shift and the idle-speed increasing request. Thereby, the circumferential slip is suppressed which causes the damage of the primary pulley 42 and the belt 44. Then, when the actual pulley ratio reaches the target pulley ratio at timing t5, the vehicle-stop LOW shift aborting control (the pulley LOW shift aborting, the engine idle-speed normal-state returning and the clutch engaging) is started.

Next, the brake is turned off (ON→OFF) at timing t6, the vehicle starts moving by the creep torque of the torque converter 2 as shown by a vehicle-speed characteristic of FIG. 12. Then, when the accelerator is turned on (OFF→ON) at timing t7, the vehicle speed rises in response to the increases of the engine rotational speed and the primary-pulley rotational speed while keeping the actual pulley ratio. Accordingly, a favorable acceleration performance of vehicle restart can be secured.

In the vehicle-stop LOW shift control which is carried out from timing t4 to timing t5, the LOW shift control is temporarily stopped (suspended) for a time interval (from timing t4 to timing t4') until the clutch half-engagement control attains the target power-transfer amount, in the fourth embodiment. A difference between this fourth embodiment and the first embodiment in which the LOW shift control is not suspended will now be explained.

For explanatory purposes, the vehicle-stop LOW shift control in the fourth embodiment can be divided into two controls of a control for a first pulley-ratio region in which no circumferential slip of belt 44 is caused (from timing t3 to timing t4) and a control for a second pulley-ratio region in which the circumferential slip of belt 44 is caused (from timing t4' to timing t5), by regarding a LOW-shift stop region (from timing t4 to timing t4') as a boundary.

Therefore, in the control for the first pulley-ratio region (from timing t3 to timing t4), the acceleration performance of vehicle restart can be improved, and a time length necessary to bring the pulley ratio to the LOWEST region can be shortened. In the control for the second pulley-ratio region (from timing t4' to timing t5), the shift toward LOWEST region is carried out after the power-transfer amount of the forward clutch 31 has been reduced to the target power-transfer amount, so that the circumferential slip of the belt 44 can be prevented more reliably. The other operations are similar as those of the first embodiment, and therefore, explanations thereof will be omitted for the purpose of simplification of the disclosure.

Next, advantageous effects will now be explained. According to the control apparatus for an engine vehicle equipped with belt-type continuously-variable transmission in the fourth embodiment, the following advantageous effects can be obtained.

(12) The vehicle-stop LOW shift control section (FIG. 11) stops the shift toward the LOWEST region when the pulley ratio of the belt-type continuously-variable transmitting mechanism 4 becomes larger than or equal to the predetermined value. (step S47) Moreover, the vehicle-stop LOW shift control section (FIG. 11) restarts the shift toward the LOWEST region after the power-transfer amount has been reduced down to a power-transfer-amount level which causes the input torque of the belt-type continuously-variable transmitting mechanism 4 to become smaller than or equal to the clamping force of the belt 44 under the state where the pulley ratio is in the LOWEST region. Accordingly, the advantageous effects (1), (2) and (4)-(10) mentioned in the first embodiment can be obtained. Moreover, the circumferential slip which is generated due to the shortage of belt clamping force relative to the input torque of the primary pulley 42 is prevented from occurring more reliably, so that the damage of the primary pulley 42 and the belt 44 can be prevented. Furthermore, since the friction engagement element (forward clutch 31) is not completely released, the acceleration-performance of vehicle restart during the vehicle-stop LOW shift control can be enhanced.

Fifth Embodiment

In a fifth embodiment according to the present invention, a plurality of pulley-ratio LOW-region judgment values and their target power-transfer amounts are prepared, and thereby, the control of suspending the pulley LOW shift control is repeated in a step-by-step manner from the timing when the clutch half-engagement control is started to the timing when the (final) target power-transfer amount is attained.

Figure 13:
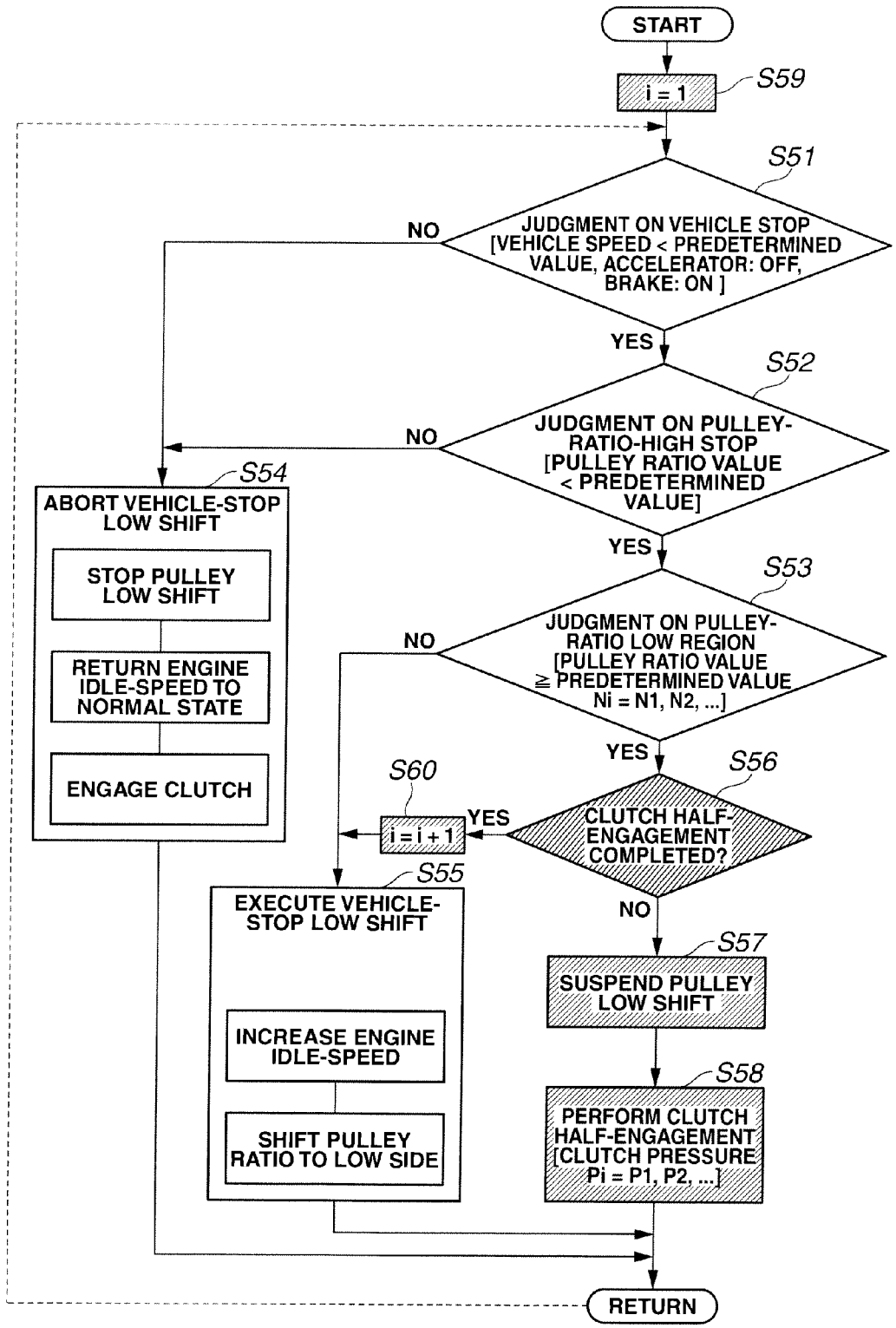
FIG. 13 a flowchart showing flow and configuration of processing of a vehicle-stop LOW shift control which is executed by the CVT control unit in a fifth embodiment according to the present invention.

At first, a configuration in the fifth embodiment will now be explained. FIG. 13 is a flowchart (vehicle-stop LOW shift control means or section) showing flow and configuration of processing of the vehicle-stop LOW shift control which is executed by the CVT control unit 8 in the fifth embodiment. Respective steps of FIG. 13 will now be explained. Since steps S51, S52, S54 and S55 of FIG. 11 are respectively same as steps S1, S2, S4 and S5 of FIG. 2, explanations thereof will be omitted for purpose of simplification of the disclosure.

At step S53 subsequent to step S52, the control unit carries out a pulley-ratio LOW-region judgment on whether or not the pulley-ratio value of the belt-type continuously-variable transmitting mechanism 4 after the determination of pulley-ratio HIGH stop is larger than or equal to a predetermined value (Ni). If YES (pulley-ratio value≥the predetermined value) at step S53, namely if it is determined that the pulley ratio has reached the predetermined pulley ratio Ni; the program proceeds to step S56. If NO (pulley-ratio value<the predetermined value) at step S53, namely if it is determined that the pulley ratio has not yet reached the predetermined pulley-ratio Ni; the program proceeds to step S55. A predetermined pulley ratio N1 which is used as the predetermined pulley ratio Ni (the predetermined value) of step S53 indicates an entrance (start) of the LOW region. This predetermined pulley ratio N1 is set at a pulley-ratio threshold value at which the input torque of the belt-type continuously-variable transmitting mechanism 4 becomes larger than the belt clamping force under the power transfer state where the forward clutch 31 is in engaged state. A region between the predetermined pulley ratio N1 and the LOWEST pulley ratio is divided into multiple regions. Thereby, each predetermined pulley ratio Ni is set as Ni=N1, N2, N3, . . . corresponding to the divided regions.

At step S56 subsequent to step S53, the control unit judges whether or not the target power-transfer amount has been attained in the clutch half-engagement control of the forward clutch 31. If YES at step S56, namely if the clutch half-engagement has been attained; the program proceeds to step S60. If NO at step S56, namely if the clutch half-engagement has not yet been attained; the program proceeds to step S57.

At step S57 subsequent to step S56, the control unit stops (suspends) the pulley LOW shift control. Then, the program proceeds to step S58.

At step S58 subsequent to step S57, the control unit carries out the clutch half-engagement control. Then, the program is returned. In this clutch half-engagement control of step S58, the target pressure for the forward clutch 31 is set at a predetermined clutch pressure Pi. A predetermined clutch pressure P1 which is used as the predetermined clutch pressure Pi corresponds to the predetermined pulley ratio N1. A pressure range between a clutch pressure corresponding to the LOWEST pulley ratio and the predetermined clutch pressure P1 is divided into multiple ranges. Thereby, each predetermined clutch pressure Pi is set as Pi=P1, P2, P3, . . . corresponding to the divided pressure ranges.

At step S59, the control unit sets a stage number i at 1 (i=1) as an initializing process that is done immediately after the start of processing flow (for the vehicle-stop LOW shift control) of FIG. 13. Then, the program proceeds to step S51.

At step S60 subsequent to step S56, the control unit increments the stage number i by 1 (i=i+1). Then, the program proceeds to step S55.

Since a schematic system configuration in the fifth embodiment is similar as that (FIG. 1) in the first embodiment, illustrations and explanations thereof will be omitted for purpose of simplification of the disclosure.

Next, operations of the vehicle-stop LOW shift control which is started in the HIGH region will now be explained according to the fifth embodiment. In the case that the start condition (criterion) of the vehicle-stop LOW shift control is satisfied when the pulley ratio is in the HIGH region, a flow proceeding as step S51→step S52→step S53→step S55→RETURN in the flowchart of FIG. 13 is repeated. That is, at step S55, the engine idle-speed increasing control and the pulley LOW shift control are executed as the vehicle-stop LOW shift control.

Then, when it is determined that the pulley ratio (value) is larger than or equal to the predetermined pulley ratio N1 at step S53 because of the progress of the vehicle-stop LOW shift control and also it is determined that the half-engagement control for bringing the pressure of the forward clutch 31 to the predetermined clutch pressure P1 has not yet been completed at step S56; a flow proceeding as step S51→step S52→step S53→step S56→step S57→step S58→RETURN in the flowchart of FIG. 13 is repeated. That is, the pulley LOW shift control is suspended (temporarily stopped) at step S57, and the clutch half-engagement control for reducing the oil pressure of forward clutch 31 down to the predetermined clutch pressure P1 is executed at step S58.

Then, when the oil pressure of the forward clutch 31 reaches the predetermined clutch pressure P1 by the execution of the clutch half-engagement control, a flow proceeding as step S51→step S52→step S53→step S56→step S60→step S55→RETURN in the flowchart of FIG. 13 is repeated. That is, at step S55, the engine idle-speed increasing control and the pulley LOW shift control are executed under the clutch half-engaged state. At this time, at step S60, the stage number i is incremented by 1 (i=+1). The above-mentioned processing based on the predetermined pulley ratio N1 and the predetermined clutch pressure P1 is changed into a similar processing based on the predetermined pulley ratio N2 and the predetermined clutch pressure P2. Afterward, the stage number i is incremented by 1 (i=i+1) sequentially to rewrite the predetermined pulley ratio Ni and the predetermined clutch pressure Pi, so that the above-mentioned processing is repeated based on the predetermined pulley ratio Ni and the predetermined clutch pressure Pi.

Then, when the pulley ratio reaches the LOWEST region because of the execution of the vehicle-stop LOW shift control, a flow proceeding as step S51→step S52→step S54→RETURN in the flowchart of FIG. 13 is repeated. That is, at step S54, the pulley LOW shift aborting control, the engine idle-speed normal-state returning control and the clutch engaging control are executed as the vehicle-stop LOW shift aborting control.

Moreover, if the driver releases the brake(-pedal) according to his vehicle-restart intention after the vehicle-stop LOW shift control, the program proceeds as step S51→step S54 in the flowchart of FIG. 13. When the vehicle-stop LOW shift aborting control of step S54 has been completed, the normal pulley-ratio shift control is carried out to cause the actual pulley ratio to follow the target pulley ratio.

Figure 14:
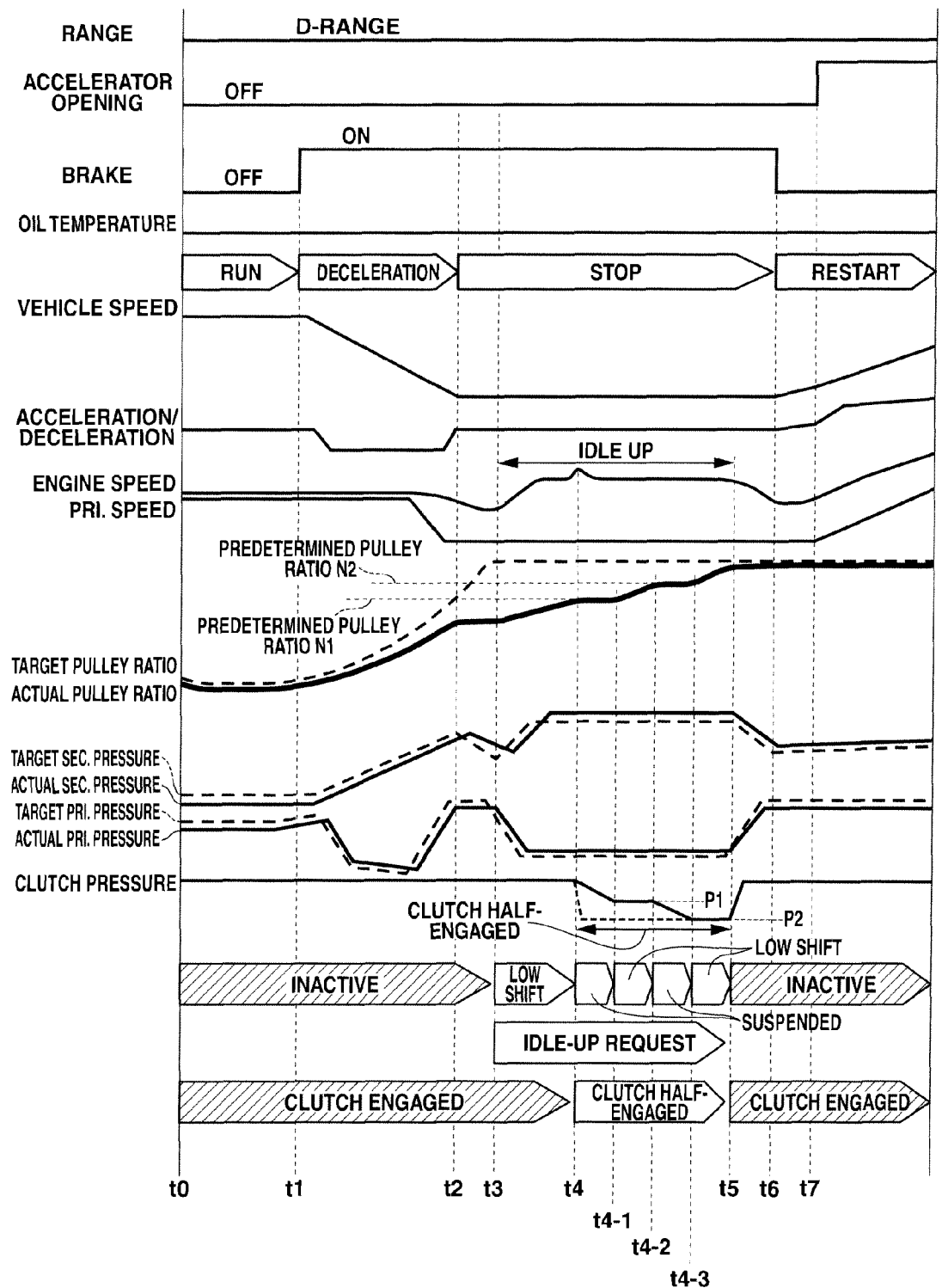
FIG. 14 is a time chart which explains operations of the vehicle-stop LOW shift control started in the HIGH region according to the fifth embodiment, and which shows respective characteristics of the range position, the accelerator opening, the brake, the oil temperature, the vehicle speed, the acceleration/deceleration, the engine speed, the primary-pulley speed, the target pulley ratio, the actual pulley ratio, the target secondary pressure, the actual secondary pressure, the target primary pressure, the actual primary pressure and the clutch pressure.

Now, the operations of the vehicle-stop LOW shift control which is started in the HIGH region will be explained based on a time chart of FIG. 14 showing a pattern of running (moving)→deceleration→stop→restart.

The accelerator is turned off (ON→OFF) during the vehicle running at timing t0, and the brake is turned on (OFF→ON) at timing t1. Thereby, the vehicle starts to be decelerated from time t1. Then, the vehicle actually stops at timing t2, and it is determined that the vehicle has stopped at timing t3. Concurrently at timing t3, the vehicle-stop LOW shift control is started to conduct the LOW shift and the idle-speed increasing request. By this vehicle-stop LOW shift control, after timing t3, the actual pulley ratio rises toward the target pulley ratio (LOWEST pulley ratio) in the step-by-step manner (in a shape of multiple steps) as shown by an actual-pulley-ratio characteristic of FIG. 14.

Next, when it is determined that the pulley ratio has reached the predetermined pulley ratio N1 at timing t4, the LOW shift control is suspended, and the clutch half-engagement control is started (It is noted that the idle-speed increasing request is continued). Then, when the predetermined clutch pressure P1 is attained at timing t4-1 by execution of the clutch half-engagement control, the LOW shift is restarted by releasing the suspended state of the LOW shift. In the same manner, when it is determined that the pulley ratio has reached the predetermined pulley ratio N2 at timing t4-2, the LOW shift control is suspended, and the clutch half-engagement control is started again. Then, when the predetermined clutch pressure P2 is attained at timing t4-3 by execution of the clutch half-engagement control, the LOW shift is restarted by releasing the suspended state of the LOW shift. Then, when the actual pulley ratio reaches the target pulley ratio at timing t5, the vehicle-stop LOW shift aborting control (the pulley LOW shift aborting, the engine idle-speed normal-state returning and the clutch engaging) is started.

Next, the brake is turned off (ON→OFF) at timing t6, the vehicle starts moving by the creep torque of the torque converter 2 as shown by a vehicle-speed characteristic of FIG. 14. Then, when the accelerator is turned on (OFF→ON) at timing t7, the vehicle speed rises in response to the increases of the engine rotational speed and the primary-pulley rotational speed while keeping the actual pulley ratio. Accordingly, a favorable acceleration performance of vehicle restart can be secured.

In the vehicle-stop LOW shift control which is carried out from timing t4 to timing t5, the clutch half-engagement control is executed repeatedly in a step-by-step manner. That is, the LOW shift control is temporarily stopped (suspended) for time intervals (from t4 to t4-1, from t4-2 to t4-3) until the clutch half-engagement control completes the reduction of power-transfer amount, in the fifth embodiment. A difference between this fifth embodiment and the first embodiment in which the step-by-step clutch half-engagement control and the temporary stop of the LOW shift control are not performed will now be explained.

In the vehicle-stop LOW shift control in the fifth embodiment, for example, the control for the pulley-ratio region in which the circumferential slip of belt 44 is caused is performed in two stages (from t4-1 to t4-2, from t4-3 to t5), regarding the LOW-shift stop regions (from t4 to t4-1, from t4-2 to t4-3) as boundaries.

Therefore, in the control for the pulley-ratio region in which no circumferential slip of belt 44 is caused (from timing t3 to timing t4), the acceleration performance of vehicle restart can be improved, and a time length necessary to bring the pulley ratio to the LOWEST region can be shortened. In the control for the pulley-ratio region in which the circumferential slip of belt 44 is caused (from timing t4 to timing t5), the suspended LOW shift is restarted after the power-transfer amount of the forward clutch 31 has been reduced down to the target power-transfer amount. Then, such an operation is repeated (i=1, 2, 3, . . . ). Thereby, the circumferential slip of the belt 44 can be reliably avoided. The other operations are similar as those of the first embodiment, and therefore, explanations thereof will be omitted for the purpose of simplification of the disclosure.

Next, advantageous effects will now be explained. According to the control apparatus for an engine vehicle equipped with belt-type continuously-variable transmission in the fifth embodiment, the following advantageous effects can be obtained.

(13) The vehicle-stop LOW shift control section (FIG. 13) sets a plurality of threshold values at each of which the input torque of the belt-type continuously-variable transmitting mechanism 4 becomes larger than the clamping force of the belt 44 under the power-transferring state where the friction engagement element (forward clutch 31) is in the engaged state, as a plurality of predetermined values (N1, N2, N3, . . . ). The vehicle-stop LOW shift control section (FIG. 13) repeats the shift suspension and the reduction of power-transfer amount corresponding to the set plurality of predetermined values (N1, N2, N3, . . . ) in such a manner that the shift toward the LOWEST region is suspended when the pulley ratio of the belt-type continuously-variable transmitting mechanism 4 reaches a first predetermined value N1 of the plurality of predetermined values (N1, N2, N3, . . . ), and then, the shift toward the LOWEST region is restarted after the power-transfer amount has been reduced down to a first power-transfer-amount level which causes the input torque of the belt-type continuously-variable transmitting mechanism 4 to become smaller than or equal to the clamping force of the belt 44, and that the shift toward the LOWEST region is suspended when the pulley ratio of the belt-type continuously-variable transmitting mechanism 4 reaches a next second predetermined value N2 of the plurality of predetermined values (N1, N2, N3, . . . ), and then, the shift toward the LOWEST region is restarted after the power-transfer amount has been reduced down to a second power-transfer-amount level which causes the input torque of the belt-type continuously-variable transmitting mechanism 4 to become smaller than or equal to the clamping force of the belt 44. Accordingly, the advantageous effects (1), (2) and (4)-(10) mentioned in the first embodiment can be obtained. Moreover, the circumferential slip which is generated due to the shortage of belt clamping force relative to the input torque of the primary pulley 42 is certainly prevented from occurring, so that the damage of the primary pulley 42 and the belt 44 can be prevented. Furthermore, since the engaged state of the friction engagement element (forward clutch 31) is kept and changed in a step-by-step manner, the restart acceleration-performance of vehicle can be enhanced even if the restart request of vehicle occurs soon after the start of the vehicle-stop LOW shift control.

Although the invention has been described above with reference to the first to fifth embodiments according to the present invention, the invention is not limited to the embodiments described above. Modifications and variations of the embodiments described above will occur to those skilled in the art in light of the above teachings.

For example, in the above first to fifth embodiments, it is predicted whether or not the circumferential slip will occur by using the variation amount of rotational speed of the primary pulley 42. However, according to the present invention, it may be predicted whether or not the circumferential slip will occur by using a variation of the pulley ratio.

For example, in the above first to fifth embodiments, the belt-type continuously-variable transmitting mechanism 4 using the belt 44 as a power-transferring member is exemplified as a continuously-variable transmitting mechanism. However, the continuously-variable transmitting mechanism according to the present invention may be a chain-type continuously-variable transmitting mechanism using a chain as the power-transferring member. Moreover, in the above first to fifth embodiments, the belt-type continuously-variable transmitting mechanism 4 is configured to vary its pulley ratio by hydraulic control. However, according to the present invention, the belt-type continuously-variable transmitting mechanism 4 may be configured to vary its pulley ratio by an electrically-actuated sandwiching-force control other than the hydraulic control.

For example, in the above first to fifth embodiments, the forward clutch 31 which is engaged when the D-range (forward-running mode) is selected is exemplified as the friction engagement element to be controlled. However, according to the present invention, the friction engagement element to be controlled may be the reverse brake 32 which is engaged when the R-range (reverse-running mode) is selected. Moreover, according to the present invention, not only the forward clutch 31 but also the reverse brake 32 may be used as the friction engagement elements to be controlled, so that the vehicle-stop LOW shift control is performed not only at the time of forward running but also at the time of reverse running of vehicle.

For example, in the above first to fifth embodiments, the control apparatus according to the present invention is applied to the engine vehicle equipped with an engine as a drive source. However, the control apparatus according to the present invention is applicable to any vehicle equipped with the belt-type continuously-variable transmitting mechanism or the chain-type continuously-variable transmitting mechanism. That is, the control apparatus according to the present invention is applicable also to a vehicle equipped with a drive source other than the engine, such as a hybrid vehicle, an electric-powered vehicle and a fuel-cell vehicle.

This application is based on a prior Japanese Patent Application No. 2011-063631 filed on Mar. 23, 2011. The entire contents of this Japanese Patent Application are hereby incorporated by reference.

The scope of the invention is defined with reference to the following claims.

What is claimed is:

1. A control apparatus for a vehicle equipped with a continuously-variable transmission, the control apparatus comprising:
   a drive source;
   a continuously-variable transmitting mechanism including a primary pulley, a secondary pulley, and a power transferring member wound around the primary pulley and the secondary pulley;
   a friction engagement element provided in a drive-force transfer system between the drive source and the continuously-variable transmitting mechanism, a power-transferring state of the friction engagement element being controlled by an engaging-force control for the friction engagement element; and
   a control unit including a vehicle-stop LOW shift control section including a vehicle-stop judging section configured to judge whether or not the vehicle is in a stopped state,
   wherein the vehicle-stop LOW shift control section is configured to start a pulley LOW shift control to shift a pulley ratio of the continuously-variable transmitting mechanism toward a LOW side when the vehicle-stop judging section determines that the vehicle is in the stopped state under a power-transferring state where the friction engagement element is in an engaged state and also when the pulley ratio is not in a LOWEST region, wherein the vehicle-stop LOW shift control section is configured to
- set a pulley-ratio threshold value at which an input torque of the continuously-variable transmitting mechanism becomes larger than a clamping force of the power transferring member under the power-transferring state where the friction engagement element is in the engaged state, as a predetermined value, and
- start a half-engagement control to reduce a power-transfer amount of the friction engagement element when the pulley ratio of the continuously-variable transmitting mechanism becomes larger than or equal to the predetermined value.

2. The control apparatus as claimed in claim 1, wherein the vehicle-stop LOW shift control section is configured to reduce the power-transfer amount of the friction engagement element down to a power-transfer-amount level which causes the input torque of the continuously-variable transmitting mechanism to become smaller than or equal to the clamping force of the power transferring member under a state where the pulley ratio is in the LOWEST region.

3. The control apparatus as claimed in claim 1, wherein the vehicle-stop LOW shift control section is configured to reduce the power-transfer amount of the friction engagement element to a power-transfer-amount level which causes the input torque of the continuously-variable transmitting mechanism to gradually become smaller than or equal to the clamping force of the power transferring member, in dependence upon a progress of the pulley LOW shift control.

4. The control apparatus as claimed in claim 1, wherein the vehicle-stop LOW shift control section is configured to
- suspend the pulley LOW shift control when the pulley ratio of the continuously-variable transmitting mechanism becomes larger than or equal to the predetermined value, then
- execute the half-engagement control such that the power-transfer amount is reduced down to a power-transfer-amount level which causes the input torque of the continuously-variable transmitting mechanism to become smaller than or equal to the clamping force of the power transferring member under a state where the pulley ratio is in the LOWEST region, and then
- restart the pulley LOW shift control.

5. The control apparatus as claimed in claim 1,
wherein the vehicle-stop LOW shift control section is configured to set, as a plurality of predetermined values, a plurality of threshold values at each of which the input torque of the continuously-variable transmitting mechanism becomes larger than the clamping force of the power transferring member under the power-transferring state where the friction engagement element is in the engaged state,
wherein the vehicle-stop LOW shift control section is configured to
- suspend the pulley LOW shift control every time the pulley ratio becomes larger than or equal to each of the plurality of predetermined values, then
- execute the half-engagement control, and then
- restart the pulley LOW shift control.

6. The control apparatus as claimed in claim 1, wherein the vehicle-stop LOW shift control section is configured to
- start the half-engagement control concurrently with a start of the pulley LOW shift control if the pulley ratio of the continuously-variable transmitting mechanism is larger than or equal to the predetermined value when a start condition of the pulley LOW shift control is satisfied.

7. The control apparatus as claimed in claim 1, wherein
the vehicle-stop LOW shift control section is configured to carry out a drive-source rotational-speed increasing control to increase a rotational speed of the drive source obtained when the vehicle-stop judging section determines that the vehicle is in the stopped state, when the pulley LOW shift control is being carried out.

8. The control apparatus as claimed in claim 7, wherein
the vehicle-stop LOW shift control section is configured to start the drive-source rotational-speed increasing control concurrently when starting the pulley LOW shift control.

9. A control apparatus for a vehicle equipped with a continuously-variable transmission, the control apparatus comprising:
- a drive source;
- a continuously-variable transmitting mechanism including a primary pulley, a secondary pulley, and a power transferring member wound around the primary pulley and the secondary pulley;
- a friction engagement element provided in a drive-force transfer system between the drive source and the continuously-variable transmitting mechanism, a power-transferring state of the friction engagement element being controlled by an engaging-force control for the friction engagement element; and
- vehicle-stop LOW shift control means including vehicle-stop judging means for judging whether or not the vehicle is in a stopped state,
wherein the vehicle-stop LOW shift control means starts a pulley LOW shift control to shift a pulley ratio of the continuously-variable transmitting mechanism toward a LOW side when the vehicle-stop judging means determines that the vehicle is in the stopped state under a power-transferring state where the friction engagement element is in an engaged state and also when the pulley ratio is not in a LOWEST region,
wherein the vehicle-stop LOW shift control means
- set, as a predetermined value, a pulley-ratio threshold value at which an input torque of the continuously-variable transmitting mechanism becomes larger than a clamping force of the power transferring member under the power-transferring state where the friction engagement element is in the engaged state, and
- start a half-engagement control to reduce a power-transfer amount of the friction engagement element when the pulley ratio of the continuously-variable transmitting mechanism becomes larger than or equal to the predetermined value.

* * * * *